US011897995B2

(12) United States Patent
Gernandt et al.

(10) Patent No.: US 11,897,995 B2
(45) Date of Patent: Feb. 13, 2024

(54) ALLOPHANATE BASED DISPERSING AGENT

(71) Applicant: BASF SE, Ludwigshafen am Rhein (DE)

(72) Inventors: Andreas Gernandt, Ludwigshafen am Rhein (DE); Huiguang Kou, Ludwigshafen am Rhein (DE); Steffen Onclin, Ludwigshafen am Rhein (DE); Clemens Auschra, Ludwigshafen am Rhein (DE); Johannes Hermann Willenbacher, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/626,842

(22) PCT Filed: Jul. 17, 2020

(86) PCT No.: PCT/EP2020/070296
§ 371 (c)(1),
(2) Date: Jan. 13, 2022

(87) PCT Pub. No.: WO2021/009351
PCT Pub. Date: Jan. 21, 2021

(65) Prior Publication Data
US 2022/0275146 A1    Sep. 1, 2022

(30) Foreign Application Priority Data

Jul. 18, 2019  (EP) ................................ 19186964

(51) Int. Cl.
| C08G 18/81 | (2006.01) |
| C08G 18/28 | (2006.01) |
| C08G 18/83 | (2006.01) |
| C08G 18/78 | (2006.01) |
| C09D 175/04 | (2006.01) |

(52) U.S. Cl.
CPC ....... *C08G 18/7837* (2013.01); *C08G 18/285* (2013.01); *C08G 18/8175* (2013.01); *C08G 18/833* (2013.01); *C09D 175/04* (2013.01)

(58) Field of Classification Search
CPC ............. C08G 18/285; C08G 18/7837; C08G 18/8175; C08G 18/833
See application file for complete search history.

(56) References Cited

U.S. PATENT DOCUMENTS

| 4,180,644 A | 12/1979 | Marquis et al. |
| 4,191,706 A | 3/1980 | Marquis et al. |
| 4,191,835 A | 3/1980 | Habermeier et al. |
| 4,247,677 A | 1/1981 | Schmidt et al. |
| 4,260,729 A | 4/1981 | Schmidt et al. |
| 5,231,149 A | 7/1993 | Longley et al. |
| 5,739,251 A * | 4/1998 | Venham ............... C08G 18/672 522/90 |
| 2003/0212291 A1 | 11/2003 | Gajewski et al. |
| 2008/0182080 A1* | 7/2008 | Kruger ................. C09D 175/16 522/90 |
| 2008/0275155 A1* | 11/2008 | Wagner ............... C08G 18/0828 522/174 |
| 2011/0027585 A1* | 2/2011 | Pritschins .......... C08G 18/8077 528/45 |
| 2020/0030260 A1* | 1/2020 | Sherrington ......... A61K 31/137 |

FOREIGN PATENT DOCUMENTS

| EP | 0021569 A1 | 1/1981 |
| EP | 0154678 A1 | 9/1985 |
| EP | 0438836 A1 | 7/1991 |
| EP | 1930356 A2 | 6/2008 |
| WO | 92/13911 A1 | 8/1992 |
| WO | WO-9712924 A1 * | 4/1997 | .......... C08G 18/706 |
| WO | 00/40630 A1 | 7/2000 |
| WO | WO-0039183 A1 * | 7/2000 | ............... A61K 6/09 |
| WO | 03/46029 A1 | 6/2003 |
| WO | 2008/098972 A1 | 8/2008 |
| WO | 2008/107326 A1 | 9/2008 |
| WO | 2014/066358 A1 | 5/2014 |

OTHER PUBLICATIONS

International Search Report and Written Opinion received for PCT Patent Application No. PCT/EP2020/070296, dated Oct. 12, 2020, 11 pages.
European Search Report for EP Patent Application No. 19186964.3, dated Jan. 21, 2020, 3 pages.
International Preliminary Report on Patentability received for PCT Patent Application No. PCT/EP2020/070296, dated Jan. 27, 2022, 10 pages.
Zeno W. Wicks Jr., "Blocked isocyanates", Progress in Organic Coatings, vol. 3, Issue 1, Mar. 1975, pp. 73-99.
Zeno W. Wicks Jr., "New developments in the field of blocked isocyanates", Progress in Organic Coatings, vol. 9, Issue 1, Apr. 16, 1981, pp. 3-28.

* cited by examiner

*Primary Examiner* — Michael L Leonard
(74) *Attorney, Agent, or Firm* — Faegre Drinker Biddle & Reath LLP

(57) ABSTRACT

The presently claimed invention is directed to a copolymer obtained by reacting at least one isocyanate (A) comprising at least one allophanate group and at least one active double bond with at least one isocyanate reactive component (B) to form an intermediate product (C); and reacting the intermediate product (C) with at least one active double bond reactive component (D) to obtain the copolymer which can be used as dispersant. The at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

22 Claims, No Drawings

ALLOPHANATE BASED DISPERSING AGENT

CROSS-REFERENCE TO RELATED APPLICATIONS

This application is a national stage application (under 35 U.S.C. § 371) of PCT/EP2020/070296, filed Jul. 17, 2020, which claims benefit of European Application No. 19186964.3, filed Jul. 18, 2019, both of which are incorporated herein by reference in their entirety.

FIELD OF THE INVENTION

The presently claimed invention is directed to a copolymer obtained by reacting at least one isocyanate (A) comprising at least one allophanate group and at least one active double bond with at least one isocyanate reactive component (B) to form an intermediate product (C); and reacting the intermediate product (C) with at least one active double bond reactive component (D) to obtain the copolymer which can be used as dispersant.

BACKGROUND OF THE INVENTION

Dispersions containing solid dispersible particles, such as organic or inorganic pigments and fillers, and polymer additives, namely dispersants, are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of the polymeric dispersant in such dispersions is manifold. Mainly, they act as stabilizers for the solid particulate materials, i.e. the dispersant separates the particles of the solid particulate material and, thus, prevents them from coagulation or clumping and settling from the liquid phase. They also may act as solubilizers in the given carrier liquid, e.g. water or organic solvents. The polymer additives may also improve the gloss of the dispersion or enhance its rheology. Depending on the type and the polarity of the dispersing agent, e.g. water, organic solvents or mixtures thereof, polymers of variable structure are selected. In view of the current and future ecological requirements, the use of the aqueous pigment dispersions is particularly preferred, as well as the use of dispersions based on organic solvents with high solids content.

In view of the almost unlimited range of different technical applications, there remains a growing need for dispersants of improved pigment affinity and rheology behaviour, as expressed by the viscosity of the millbase at a given shear rate and improved gloss of surface coatings.

WO 1992/13911 relates to an acetoacetanilide functionalized poly(alkylene glycol), which is prepared by reacting a poly(alkylene glycol) monoamine, diamine or triamine with isatoic anhydride followed by acetoacetylation of the resultant aminobenzamide.

WO 2000/40630 discloses pigment dispersions containing block copolymers as dispersants prepared by the ATRP method (atom transfer radical polymerisation) of ethylenically unsaturated monomers. The block copolymers consist of defined hydrophobic and hydrophilic polymer blocks.

WO 2003/046029 discloses block copolymers as dispersants, which are similar to those of WO 2000/40630, but are subsequently neutralized with specific salt forming compounds.

WO 2008/107326 and the literature cited therein relates to poly(alkylene imine) grafted polymers of the acrylate, polyether or polyester type, which are useful as pigment dispersants.

Polymers having pending anthranilate or anthranilamide groups, which may be attached directly or via a bivalent spacer to the polymer back-bone or to the termini of the polymers have been described several times as crosslinkers or chain extenders for polyurethanes or epoxies, e.g. from the following patent documents:

Anthranilate functionalized poly(alkylene oxide)s are e.g. known from U.S. Pat. Nos. 4,180,644, 4,191,706, 4,191,835, 4,247,677, 4,260,729 and US 2003/212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyurea and polyurea-polyurethane.

Anthranilate functionalized polycarbonates are e.g. known from U.S. Pat. No. 5,231,149.

They are used to produce graft or block copolymers having improved impact and solvent resistance.

There is an ongoing need to develop dispersants having beneficial properties, such as superior pigment affinity, improved rheology behaviour and improved gloss of surface coatings, while being used as a dispersant in coating compositions.

Hence, it is an object of the presently claimed invention to provide dispersants having beneficial properties, such as superior pigment affinity, improved rheology behaviour and improved gloss of surface coatings, while being used in coating compositions.

SUMMARY OF INVENTION

Surprisingly, it was found that a copolymer obtained by reacting at least one isocyanate (A) comprising at least one allophanate group and at least one active double bond with at least one isocyanate reactive component (B) to form an intermediate product (C); and reacting the intermediate product (C) with at least one active double bond reactive component (D) showed beneficial properties such as superior pigment affinity, improved rheology behaviour, improved gloss of surface coatings, justness and undertone, when being used in coating compositions.

Thus, in a first aspect, the presently claimed invention is directed to a copolymer obtained by:

a. reacting at least one isocyanate (A) comprising at least one allophanate group and at least one active double bond with at least one isocyanate reactive component (B) to form an intermediate product (C); and b. reacting the intermediate product (C) obtained in step a. with at least one active double bond reactive component (D) to obtain the copolymer;

wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

In a second aspect, the presently claimed invention is directed to a method for preparing a copolymer, wherein the process comprises the steps of:

i) mixing at least one isocyanate (A) comprising at least one allophanate group and at least one active double bond, with at least one isocyanate reactive component (B) to obtain a mixture;

ii) heating the mixture obtained in step a. to a desired temperature to obtain an intermediate product (C);

iii) mixing the intermediate product (C) obtained in step b. with at least one active double bond reactive component (D) to obtain a mixture; and iv) heating the mixture obtained in step c. to a desired temperature to obtain the copolymer;

wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

In a third aspect, the presently claimed invention is directed to a liquid composition in the form of a dispersion comprising the copolymer as described herein, and a particulate solid material selected from the group consisting of pigments and fillers and a liquid diluent, wherein the particulate solid material is dispersed in the liquid diluent.

In a fourth aspect, the presently claimed invention is directed to the use of the copolymer as described herein and the salts thereof as a dispersant for particulate solid materials selected from the group consisting of pigments and fillers.

DETAILED DECEPTION OF INVENTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

In one embodiment, the presently claimed invention is directed to a copolymer obtained by:

a. reacting at least one isocyanate (A) comprising at least one allophanate group and at least one active double bond with at least one isocyanate reactive component (B) selected from the group consisting of monofunctional polyether amines (B1), monofunctional polyether alcohols (B2), $C_6$-$C_{30}$ monofunctional alcohols (B3), and monofunctional polyester alcohol (B4) to form an intermediate product (C); and b. reacting the intermediate product (C) obtained in step a. with at least one active double bond reactive component (D) to obtain the copolymer; more preferably, a copolymer obtained by:

a. reacting at least one isocyanate (A) comprising at least one allophanate group and at least one active double bond with at least one isocyanate reactive component (B) selected from the group consisting of monofunctional polyether amines (B1), monofunctional polyether alcohols (B2), and $C_6$-$C_{30}$ monofunctional alcohols (B3) to form an intermediate product (C); and b. reacting the intermediate product (C) obtained in step a. with at least one active double bond reactive component (D) to obtain the copolymer;

even more preferably, a copolymer obtained by:

a. reacting at least one isocyanate (A) comprising at least one allophanate group and at least one active double bond with at least one isocyanate reactive component (B) selected from the group consisting of monofunctional polyether amines (B1) and monofunctional polyether alcohols (B2) to form an intermediate product (C); and b. reacting the intermediate product (C) obtained in step a. with at least one active double bond reactive component (D) to obtain the copolymer; and most preferably, a copolymer obtained by:

a. reacting at least one isocyanate (A) comprising at least one allophanate group and at least one active double bond with at least one monofunctional polyether amine (B1) to form an intermediate product (C); and b. reacting the intermediate product (C) obtained in step a. with at least one active double bond reactive component (D) to obtain the copolymer;

wherein the at least one active double bond reactive component (D) is selected from a primary amine and a secondary amine.

Isocyanate (A)

In a preferred embodiment, the isocyanate (A) is an aliphatic or an alicyclic or an aromatic polyisocyanate of formula (A), formula (A)

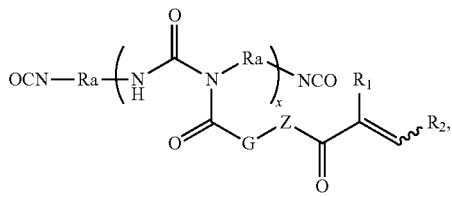

wherein x is an integer from 1 to 10;

$R_a$ is a divalent aliphatic $C_2$-$C_{20}$ hydrocarbon unit or an alicyclic $C_5$-$C_{20}$ hydrocarbon unit or an aromatic $C_5$-$C_{20}$ hydrocarbon unit;

Z is selected from the group consisting of —O—, —$NR_5$— and —S—;

$R_1$ and $R_2$ are independently of each other selected from the group consisting of H, linear or branched, substituted or unsubstituted $C_1$-$C_{30}$ alkyl, linear or branched, substituted or unsubstituted $C_2$-$C_{30}$ alkenyl, and substituted or unsubstituted phenyl;

G is selected from the group consisting of —$(CH_2)_k$—O—, —$(CH_2$—$CH_2$—O$)_m$—, —$(—CH(R^3)—CH(R^4)—O—)_n$—, —$CH_2$—$CH(OH)$—$CH_2$—O—$C(=O)$—$C(CH_3)$=$CH_2$ and —$CH_2$—$CH(O—)$—$CH_2$—O—$C(=O)$—$CH=CH_2$;

wherein k, m and n are independently of each other an integer in the range of ≥1 to ≤20, $R_3$ and $R_4$ are independently of each other selected from the group consisting of H, methyl, ethyl, propyl, isopropyl, n-butyl, isobutyl and tert-butyl, $R_5$ is selected from the group consisting of H, linear or branched, substituted or unsubstituted $C_1$-$C_{30}$ alkyl, linear or branched, substituted or unsubstituted $C_2$-$C_{30}$ alkenyl and substituted or unsubstituted phenyl;

more preferably, the isocyanate (A) is an aliphatic or an alicyclic or an aromatic polyisocyanate of formula (A), formula (A)

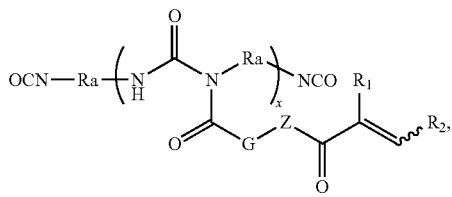

wherein x is an integer from 1 to 10;

$R_a$ is a divalent aliphatic $C_2$-$C_{20}$ hydrocarbon unit or an alicyclic $C_5$-$C_{20}$ hydrocarbon unit or an aromatic $C_5$-$C_{20}$ hydrocarbon unit;

Z is selected from the group consisting of —O—, —$NR_5$— and —S—;

$R_1$ and $R_2$ are independently of each other selected from the group consisting of H, linear or branched, substituted or unsubstituted $C_1$-$C_{20}$ alkyl, linear or branched, substituted or unsubstituted $C_2$-$C_{20}$ alkenyl, and substituted or unsubstituted phenyl;

G is selected from the group consisting of —$(CH_2)_k$—O—, —$(CH_2$—$CH_2$—O$)_m$—, —$(—CH(R^3)—CH(R^4)—O—)_n$—, —$CH_2$—$CH(OH)$—$CH_2$—O—$C(=O)$—$C(CH_3)$=$CH_2$ and —$CH_2$—$CH(O—)$—$CH_2$—O—$C(=O)$—$CH=CH_2$;

wherein k, m and n are independently of each other an integer in the range of ≥1 to ≤20, $R_3$ and $R_4$ are independently of each other selected from the group consisting of H, methyl, ethyl, propyl, isopropyl, n-butyl, isobutyl and tert-butyl, $R_5$ is selected from the group consisting of H, linear or branched, substituted or unsubstituted $C_1$-$C_{20}$ alkyl, linear or branched, substituted or unsubstituted $C_2$-$C_{20}$ alkenyl and substituted or unsubstituted phenyl;

even more preferably, the isocyanate (A) is an aliphatic or an alicyclic or an aromatic polyisocyanate of formula (A), formula (A)

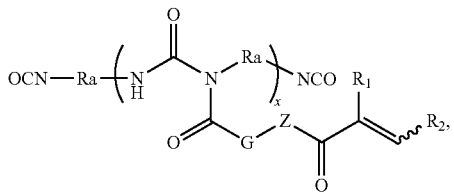

wherein x is an integer from 1 to 5;

$R_a$ is a divalent aliphatic $C_2$-$C_{20}$ hydrocarbon unit or an alicyclic $C_5$-$C_{20}$ hydrocarbon unit or an aromatic $C_5$-$C_{20}$ hydrocarbon unit;

Z is selected from the group consisting of —O—, and —$NR_5$—;

$R_1$ and $R_2$ are independently of each other selected from the group consisting of H, linear or branched, substituted or unsubstituted $C_1$-$C_{10}$ alkyl, linear or branched, substituted or unsubstituted $C_2$-$C_{20}$ alkenyl, and substituted or unsubstituted phenyl;

G is selected from the group consisting of —$(CH_2)_k$—O—, —$(CH_2$—$CH_2$—O$)_m$—, —$(—CH(R^3)—CH(R^4)—O—)_n$—, —$CH_2$—$CH(OH)$—$CH_2$—O—$C(=O)$—$C(CH_3)$=$CH_2$ and —$CH_2$—$CH(O—)$—$CH_2$—O—$C(=O)$—$CH=CH_2$;

wherein k, m and n are independently of each other an integer in the range of ≥1 to ≤20, $R_3$ and $R_4$ are independently of each other selected from the group consisting of H and methyl, $R_5$ is selected from the group consisting of H, linear or branched, substituted or unsubstituted $C_1$-$C_{10}$ alkyl, linear or branched, substituted or unsubstituted $C_2$-$C_{10}$ alkenyl, and substituted or unsubstituted phenyl;

most preferably, the isocyanate (A) is an aliphatic or an alicyclic or an aromatic polyisocyanate of formula (A), formula (A)

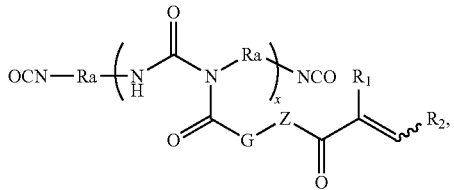

wherein x is an integer from 2 to 5;

$R_a$ is a divalent aliphatic $C_2$-$C_{20}$ hydrocarbon unit or an alicyclic $C_5$-$C_{20}$ hydrocarbon unit or an aromatic $C_5$-$C_{20}$ hydrocarbon unit;

Z is selected from the group consisting of —O— and —NR$_5$—;

R$_1$ and R$_2$ are selected from the group consisting of H, linear or branched, substituted or unsubstituted C$_1$-C$_3$alkyl and linear or branched, substituted or unsubstituted C$_2$-C$_3$alkenyl;

G is selected from the group consisting of —(CH$_2$)$_k$—O—, —(CH$_2$—CH$_2$—O)$_m$— and —(—CH(R$^3$)—CH(R$^4$)—O—)$_n$—;

wherein k, m and n are independently of each other an integer in the range of ≥1 to ≤20, R$_3$ and R$_4$ are independently of each other selected from the group consisting of H and methyl, and R$_5$ is selected from the group consisting of the group consisting of H, linear or branched, substituted or unsubstituted C$_1$-C$_3$alkyl and linear or branched, substituted or unsubstituted C$_2$-C$_3$alkenyl; and in particular, the isocyanate (A) is an aliphatic or an alicyclic or an aromatic polyisocyanate of formula (A),

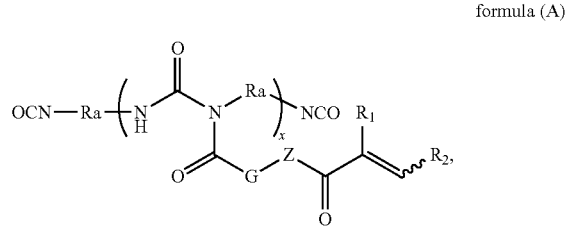

formula (A)

wherein x is an integer from 2 to 5;

R$_a$ is a divalent aliphatic C$_2$-C$_{20}$ hydrocarbon unit or an alicyclic C$_5$-C$_{20}$ hydrocarbon unit or an aromatic C$_5$-C$_{20}$ hydrocarbon unit;

Z is selected from the group consisting of —O— and —NR$_5$—;

R$_1$ and R$_2$ are H;

G is selected from the group consisting of —(CH$_2$—CH$_2$—O)$_m$— and —(—CH(R$^3$)—CH(R$^4$)—O—)$_n$—;

wherein k, m and n are independently of each other an integer in the range of ≥1 to ≤20, R$_3$ and R$_4$ are independently of each other selected from the group consisting of H and methyl, and R$_5$ is H.

In a preferred embodiment, the at least one isocyanate (A) comprising at least one allophanate group and at least one active double bond is obtained by reacting at least one polyisocyanate (A1) with at least one compound of formula (A2),

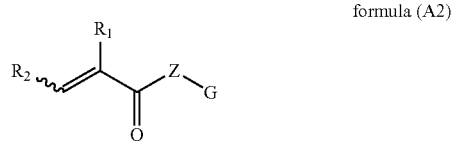

formula (A2)

wherein Z is selected from the group consisting of —O—, —NR$_5$— and —S—;

R$_1$ and R$_2$ are independently of each other selected from the group consisting of H, linear or branched, substituted or unsubstituted C$_1$-C$_{30}$ alkyl, linear or branched, substituted or unsubstituted C$_2$-C$_{30}$ alkenyl, and substituted or unsubstituted phenyl;

G is selected from the group consisting of —(CH$_2$)$_k$—OH, —(CH$_2$—CH$_2$—O)$_m$H, —(—CH(R$^3$)—CH(R$^4$)—O—)$_n$—H, —CH$_2$—CH(OH)—CH$_2$—O—C(=O)—C(CH$_3$)=CH$_2$ and —CH$_2$—CH(OH)—CH$_2$—O—C(=O)—CH=CH$_2$;

wherein k, m and n are independently of each other an integer in the range of ≥1 to ≤20, R$_3$ and R$_4$ are independently of each other selected from the group consisting of H, methyl, ethyl, propyl, isopropyl, n-butyl, isobutyl and tert-butyl, R$_5$ is selected from the group consisting of H, linear or branched, substituted or unsubstituted C$_1$-C$_{30}$ alkyl, linear or branched, substituted or unsubstituted C$_2$-C$_{30}$ alkenyl and substituted or unsubstituted phenyl;

more preferably the at least one isocyanate (A) comprising at least one allophanate group and at least one active double bond is obtained by reacting at least one polyisocyanate (A1) with at least one compound of formula (A2)

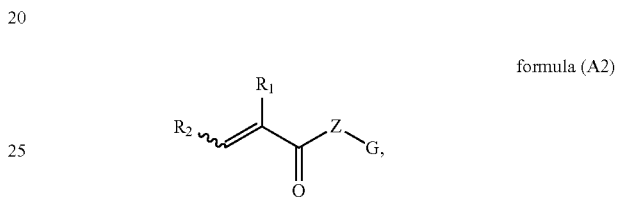

formula (A2)

wherein Z is selected from the group consisting of —O—, —NR$_5$— and —S—;

R$_1$ and R$_2$ are independently of each other selected from the group consisting of H, linear or branched, substituted or unsubstituted C$_1$-C$_{20}$ alkyl, linear or branched, substituted or unsubstituted C$_2$-C$_{20}$ alkenyl, and substituted or unsubstituted phenyl;

G is selected from the group consisting of —(CH$_2$)$_k$—OH, —(CH$_2$—CH$_2$—O)$_m$H, —(—CH(R$^3$)—CH(R$^4$)—O—)$_n$—H, —CH$_2$—CH(OH)—CH$_2$—O—C(=O)—C(CH$_3$)=CH$_2$ and —CH$_2$—CH(OH)—CH$_2$—O—C(=O)—CH=CH$_2$;

wherein k, m and n are independently of each other an integer in the range of ≥1 to ≤20, R$_3$ and R$_4$ are independently of each other selected from the group consisting of H, methyl, ethyl, propyl, isopropyl, n-butyl, isobutyl and tert-butyl, R$_5$ is selected from the group consisting of H, linear or branched, substituted or unsubstituted C$_1$-C$_{20}$ alkyl, linear or branched, substituted or unsubstituted C$_2$-C$_{20}$ alkenyl and substituted or unsubstituted phenyl;

even more preferably the at least one isocyanate (A) comprising at least one allophanate group and at least one active double bond is obtained by reacting at least one polyisocyanate (A1) with at least one compound of formula (A2),

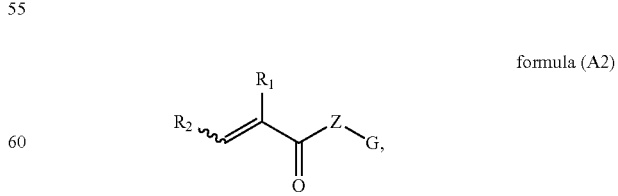

formula (A2)

wherein Z is selected from the group consisting of —O— and —NR$_5$—;

R$_1$ and R$_2$ are independently of each other selected from the group consisting of H, linear or branched, substituted or unsubstituted $C_1$-$C_{10}$ alkyl, linear or branched, substituted or unsubstituted $C_2$-$C_{10}$ alkenyl, and substituted or unsubstituted phenyl;

G is selected from the group consisting of —($CH_2$—$CH_2$—O)$_m$H and —(—CH($R^3$)—CH($R^4$)—O—)$_n$—H;

wherein k, m and n are independently of each other an integer in the range of $\geq 1$ to $\leq 20$, $R_3$ and $R_4$ are independently of each other selected from the group consisting of H and methyl, $R_5$ is selected from the group consisting of H, linear or branched, substituted or unsubstituted $C_1$-$C_{10}$ alkyl, linear or branched, substituted or unsubstituted $C_2$-$C_{10}$ alkenyl, and substituted or unsubstituted phenyl;

most preferably, the at least one isocyanate (A) comprising at least one allophanate group and at least one active double bond is obtained by reacting at least one polyisocyanate (A1) with at least one compound of formula (A2),

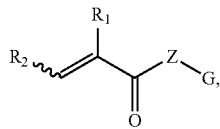

formula (A2)

wherein Z is selected from the group consisting of —O— and —NR$_5$—;

$R_1$ and $R_2$ are independently of each other selected from the group consisting of H, linear or branched, substituted or unsubstituted $C_1$-$C_{10}$ alkyl, linear or branched, substituted or unsubstituted $C_2$-$C_{10}$ alkenyl, and substituted or unsubstituted phenyl;

G is selected from —($CH_2$—$CH_2$—O)$_m$H and —(—CH($R^3$)—CH($R^4$)—O—)$_n$—H wherein m and n are independently of each other an integer in the range of $\geq 1$ to $\leq 10$, $R_3$ and $R_4$ are independently of each other selected from the group consisting of H and methyl, $R_5$ is selected from the group consisting of H, linear or branched, substituted or unsubstituted $C_1$-$C_3$ alkyl, linear or branched, substituted or unsubstituted $C_2$-$C_6$ alkenyl, and substituted or unsubstituted phenyl; and in particular the at least one isocyanate (A) comprising at least one allophanate group and at least one active double bond is obtained by reacting at least one polyisocyanate (A1) with at least one compound of formula (A2),

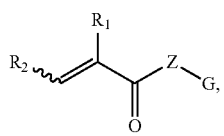

formula (A2)

wherein Z is selected from the group consisting of —O— and —NR$_5$—;

$R_1$ and $R_2$ are H;

G is selected from the group consisting of —($CH_2$—$CH_2$—O)$_m$H and —(—CH($R^3$)—CH($R^4$)—O—)$_n$—H;

wherein k, m and n are independently of each other an integer in the range of $\geq 1$ to $\leq 20$, $R_3$ and $R_4$ are independently of each other selected from the group consisting of H and methyl, and $R_5$ is H.

In another preferred embodiment, the polyisocyanate (A1) is an aliphatic polyisocyanate of $C_2$-$C_{20}$ carbon atoms or an alicyclic polyisocyanate of $C_5$-$C_{20}$ carbon atoms or an aromatic polyisocyanate of $C_5$-$C_{20}$ carbon atoms.

In another preferred embodiment, the polyisocyanate (A1) is a diisocyanate.

In another preferred embodiment, the diisocyanate (A1) is an aliphatic diisocyanate of $C_2$-$C_{20}$ carbon atoms or an alicyclic diisocyanate of $C_5$-$C_{20}$ carbon atoms or an aromatic diisocyanate of $C_5$-$C_{20}$ carbon atoms.

In another preferred embodiment, the aliphatic diisocyanates and alicyclic diisocyanates are selected from the group consisting of tetramethylene diisocyanate, isophorone diisocyanate, pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate) and 1,3- or 1,4-bis(isocyanatomethyl)cyclohexane and 2,4- or 2,6-diisocyanato-1-methylcyclohexane.

In another preferred embodiment, the aromatic diisocyanates are, selected from the group consisting of 2,4- or 2,6-tolylene diisocyanate, m- or p-xylylene diisocyanate, 2,4'- or 4,4'-diisocyanatodiphenylmethane, 1,3- or 1,4-phenylene diisocyanate, 1 chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate and diphenyl ether 4,4'-diisocyanate.

In another preferred embodiment, the isocyanate groups of the polyisocyanate (A1) can also be present in blocked form. Examples of suitable blocking agents for NCO groups are oximes, phenols, imidazoles, pyrazoles, pyrazolinones, diketopiperazines, caprolactam, malonates or compounds as specified in the publications by Z. W. Wicks, Prog. Org. Coat. 3 (1975) 73-99 and Prog. Org. Coat. 9 (1981) 3-28 and also in Houben-Weyl, Methoden der Organischen Chemie, Vol. XIV/2, p. 61 ff., Georg Thieme Verlag, Stuttgart 1963.

In another preferred embodiment, the at least one polyisocyanate (A1) is employed preferably in the form of mixtures comprising I) from 1 to 100% by weight of polyisocyanate as defined above.

II) from 0 to 99% by weight of another compound which in addition to one or more isocyanate groups includes a group selected from the series consisting of urethane, urea, biuret, allophanate, carbodiimide, uretonimine, uretdione and isocyanurate groups:

IIa) The isocyanates which may be present in the above mixtures in addition to the polyisocyanates are aliphatic and aromatic diisocyanates and, in particular, polyisocyanates of higher functionality from the following groups. Preferably, the polyisocyanates which contain isocyanurate groups and are derived from aliphatic, cycloaliphatic, aromatic and/or araliphatic diisocyanates. The isocyanatoisocyanurates generally have an NCO content of from 10 to 30% by weight, in particular from 15 to 25% by weight, and an average NCO functionality of from 2.6 to 4.5. Particularly suitable are isocyanurates of the formula (A1a) or the oligomeric forms which are derived from them,

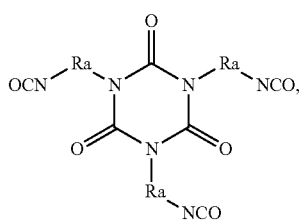

formula (A1a)

wherein $R_a$ is as defined as in compounds of the formula (A).

IIb) The diisocyanates which contain uretdione groups and have isocyanate groups attached to aromatic, aliphatic and/or cycloaliphatic structures, preferably derive from hexamethylene diisocyanate or isophorone diisocyanate. Polyuretdione diisocyanates are dimerization products of the diisocyanates.

IIc) The polyisocyanates which contain biuret groups and have isocyanate groups attached to aliphatic structures, especially tris(6-isocyanatohexyl)biuret or its mixtures with its higher homologs. These biuret polyisocyanates generally have an NCO content of from 10 to 30% by weight, in particular from 18 to 25% by weight, and an average NCO functionality of from 2.8 to 4.5

IId) The polyisocyanates containing urethane and/or allophanate groups, and having isocyanate groups attached to aliphatic or cycloaliphatic structures, which are free from free-radically polymerizable C—C double bonds, where the C—C double bonds are in activated form by virtue of a carbonyl group attached directly to them or by virtue of an oxygen atom in ether function. Compounds of this kind are obtainable, for example, by reacting excess amounts of hexamethylene diisocyanate or isophorone diisocyanate with monohydric or polyhydric $C_1$-$C_{20}$ monoalcohols, polyhydric alcohols such as ethylene glycol, trimethylolpropane, glycerol or mixtures thereof. These polyisocyanates containing urethane and/or allophanate groups generally have an NCO content of from 12 to 25% by weight and an average NCO functionality of from 2.5 to 4.5.

IIe) The polyisocyanates derived from one molecule of an alcohol and one molecule of a polyisocyanate as used to prepare the compounds of formula (A1).

IIf) The polyisocyanates which contain oxadiazinetrione groups, preferably derived from hexamethylene diisocyanate or isophorone diisocyanate. Polyisocyanates of this kind containing oxadiazinetrione groups can be prepared from diisocyanate and carbon dioxide.

IIg) The carbodiimide- or the uretonimine-modified polyisocyanates.

In another preferred embodiment, the at least one compound of formula (A2) is an ester of a α, β-unsaturated carboxylic acid with a polyol having at least two hydroxyl group or an amide of an ethylenically unsaturated carboxylic acid with an amino alcohol.

In another preferred embodiment, the at least one compound of formula (A2) is derived from acrylic acid, methacrylic acid, crotonic acid, acrylamidoglycolic acid, methacrylamidoglycolic acid or vinylacetic acid and polyols having preferably 2 to 20 carbon atoms and at least 2 hydroxyl groups, such as ethylene glycol, diethylene glycol, triethylene glycol, 1,2-propylene glycol, 1,3-propylene glycol, 1,3-propylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, pentaerythritol, ditrimethylolpropane, erythritol and sorbitol and from the vinyl ethers of the above mentioned polyols, provided they still have one free OH group.

In another preferred embodiment, the compound of formula (A2) is also derived from an α, β-unsaturated carboxylic acid and an amino alcohol such as 2-aminoethanol, 3-amino-1-propanol, 1-amino-2-propanol and 2-(2-aminoethoxy)ethanol.

In another preferred embodiment, the compound of formula (A2) is selected from the group consisting of 2-hydroxyethyl acrylate, hydroxypropyl acrylate, 4-hydroxybutyl acrylate, 3-hydroxybutyl acrylate, 2-hydroxybutyl acrylate, 1,4-butanediol mono acrylate, neopentyl glycol mono acrylate, glycerol mono- and di acrylate, trimethylolpropane mono- and di acrylate, pentaerythritol di- and tri acrylate, 2-thioethyl acrylate, thiopropyl acrylate, 1,4-butanedithiol mono acrylate, 2-hydroxyethyl (meth)acrylate, hydroxypropyl (meth)acrylate, 4-hydroxybutyl (meth)acrylate, 3-hydroxybutyl (meth)acrylate, 2-hydroxybutyl (meth)acrylate, 1,4-butanediol mono(meth)acrylate, neopentyl glycol mono(meth)acrylate, glycerol mono- and di(meth)acrylate, trimethylolpropane mono- and di(meth)acrylate, pentaerythritol di- and tri(meth)acrylate, 2-thioethyl(meth)acrylate, thiopropyl (meth)acrylate, and 1,4-butanedithiol mono(meth)acrylate. More preferably, the at least one compound of formula (A2) is selected from the group consisting of 2-hydroxyethyl acrylate, hydroxypropyl acrylate, 4-hydroxybutyl acrylate, 2-hydroxybutyl acrylate, 1,4-butanediol mono acrylate, neopentyl glycol mono acrylate, glycerol mono- and di acrylate, trimethylolpropane mono-and di acrylate, pentaerythritol di- and tri acrylate, 2-thioethyl acrylate, thiopropyl acrylate, 1,4-butanedithiol mono acrylate, 2-hydroxyethyl acrylate, 2-hydroxyethyl methacrylate, hydroxypropyl acrylate, 1,4-butanediol monoacrylate and 3-(acryloyloxy)-2-hydroxypropyl methacrylate.

In another preferred embodiment, the compound of formula (A2) is an amide of an ethylenically unsaturated carboxylic acid with amino alcohols, which are selected from the group consisting of hydroxyalkyl(meth)acrylamides such as N-hydroxymethylacrylamide, N-hydroxymethylmethacrylamide, N-hydroxyethylacrylamide, N-hydroxyethylmethacrylamide and 5-hydroxy-3-oxopentyl(meth)acrylamide, N-hydroxyalkylcrotonamides such as N-hydroxymethylcrotonamide, or N-hydroxyalkylmaleimides such as N-hydroxyethylmaleimide.

In another preferred embodiment, the at least one isocyanate (A) comprising at least one allophanate group and at least one active double bond is prepared by reacting the polyisocyanates (A1) and the alcohols (A2) at a reaction temperature in the range from $\geq 0$ to $\leq 280°$ C., more preferably in the range from $\geq 20$ to $\leq 250°$ C., in the presence of a catalyst which promotes the formation of allophanate.

In another preferred embodiment, the catalyst which promotes the formation of an allophanate is an organozinc compound selected from the group consisting of zinc acetylacetonate and zinc 2-ethylcaproate, or a tetraalkylammonium compound, such as N,N,N-trimethyl-N-2-hydroxypropylammonium hydroxide or such as N,N,N-trimethyl-N-2-hydroxypropylammonium 2-ethylhexanoate, or a zirconyl compound of formula (Z1) or formula (Z2)

formula (Z1)

wherein $R_y$ and $R_z$ are independently of each other selected from a group consisting of an alkylcarboniumoxy group, an alkoxy group, an alkyl group, a halogen group and a hydrogen residual group of an inorganic acid;

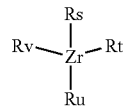

Formula (Z2)

wherein $R_s$, $R_t$, $R_u$ and $R_w$ are independently of each other selected from a group consisting of an alkyl group, an alkene group and an alkyne group.

In another preferred embodiment, the molar ratio of the polyisocyanate (A1) employed to the alcohol (A2) is generally in the range from 1.0:1.0 to 30:1.0, more preferably in the range from 1.5:1.0 to 20:1.0.

In another preferred embodiment, it is preferred to add from 0.001 to 2.0% by weight, in particular from 0.005 to 1.0% by weight, of polymerization inhibitors to the reaction to stabilize the free-radically polymerizable compounds, i.e. the at least one isocyanate (A) comprising at least one allophanate group and at least one active double bond. These compounds are the usual compounds suitable for hindering free-radical polymerization, examples being hydroquinones or hydroquinone monoalkyl ethers, 2,6-di-tert-butylphenols, such as 2,6-di-tert-butylcresol, nitrosamines, phenothiazines or phosphorous esters.

In another preferred embodiment, the isocyanate (A) has active double bonds in the range from ≥10.0 to ≤10.0, more preferably, the isocyanate (A) has active double bonds in the range from ≥1.0 to ≤8.0, even more preferably the isocyanate (A) has active double bonds in the range from ≥1.0 to ≤6.0, most preferably, the isocyanate (A) has active double bonds in the range from ≥1.0 to ≤5.0 and in particular the isocyanate (A) has 1, 2 or 3 active double bonds in.

In another preferred embodiment, the at least one active double bond is a double bond which is conjugated with at least one carbonyl group.

In another preferred embodiment, the at least one isocyanate (A) comprising at least one allophanate group and at least one active double bond contains 1, 2, 3, 4, 5, 6, 7, 8, 9 or 10 NCO groups, more preferably 1, 2, 3, 4, 5, 6, 7 or 8 NCO groups, even more preferably 1, 2, 3, 4, 5 or 6 NCO groups, most preferably 2, 3, or 4 NCO groups, in particular 2 or 3 NCO groups.

In another preferred embodiment, the isocyanate groups of the at least one isocyanate (A) can also be present in blocked form. Examples of suitable blocking agents for NCO groups are oximes, phenols, imidazoles, pyrazoles, pyrazolinones, diketopiperazines, caprolactam, malonates or compounds as specified in the publications by Z. W. Wicks, Prog. Org. Coat. 3 (1975) 73-99 and Prog. Org. Coat. 9 (1981) 3-28 and also in Houben-Weyl, Methoden der Organischen Chemie, Vol. XIV/2, p. 61 ff., Georg Thieme Verlag, Stuttgart 1963.

Isocyanate Reactive Component (B)

In another preferred embodiment, the at least one isocyanate reactive component (B) is selected from the group consisting of monofunctional polyether amines (B1), monofunctional polyether alcohols (B2), monofunctional alcohols having at least 10 carbon atoms (B3), and monofunctional polyester alcohols (B4).

In a preferred embodiment, the monofunctional polyether amine (B1) is a primary amine or a secondary amine of formula (B1),

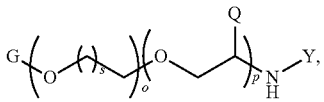

formula (B1)

wherein Y is selected from the group consisting of H, linear or branched, substituted or unsubstituted $C_1$-$C_{30}$ alkyl, and G-$(O(CH_2)_s$—$(CH_2$—$CH(Q))_p$-;
o and p are independently of each other an integer in the range of ≥0 to ≤2000;
s is an integer in the range of ≥1 to ≤10;
wherein o+p is an integer in the range of ≥1 to ≤4000; and
Q and G are independently of each other selected from the group consisting of methyl, ethyl, propyl, isopropyl, n-butyl, isobutyl, tert-butyl and substituted or unsubstituted phenyl;
more preferably, Y is selected from the group consisting of H, linear or branched, substituted or unsubstituted $C_1$-$C_{20}$ alkyl, and G-$(O(CH_2)_sCH_2)_p$—$(CH_2$—$CH(Q))_p$-;
o and p are independently of each other an integer in the range of ≥0 to ≤1000;
s is an integer in the range of ≥1 to ≤6;
wherein o+p is an integer in the range of ≥1 to ≤2000; and
Q and G are independently of each other selected from the group consisting of methyl, ethyl, propyl and isopropyl;
most preferably, Y is selected from the group consisting of H, linear or branched, substituted or unsubstituted $C_1$-$C_{10}$ alkyl, and G-$(O(CH_2)_sCH_2)_p$—$(CH_2$—$CH(Q))_p$-;
o and p are independently of each other an integer in the range of ≥0 to ≤500;
s is an integer in the range of ≥1 to ≤4;
wherein o+p is an integer in the range of ≥1 to ≤1000; and
Q and G are independently of each other selected from the group consisting of methyl, and ethyl; in particular, Y is selected from the group consisting of H and linear or branched, substituted or unsubstituted $C_1$-$C_4$ alkyl,
o and p are independently of each other an integer in the range of ≥0 to ≤100;
s is an integer in the range of ≥1 to ≤2;
wherein o+p is an integer in the range of ≥1 to ≤200; and
Q and G are methyl.

In another preferred embodiment, the monofunctional polyether amine (B1) is a primary amine of formula (B1a),

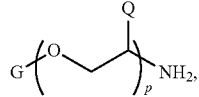

formula (B1a)

wherein p is an integer in the range of ≥0 to ≤2000, and
Q is selected from the group consisting of H, methyl, ethyl, propyl, isopropyl, n-butyl, isobutyl, tert-butyl and substituted or unsubstituted phenyl, and
G is linear or branched, substituted or unsubstituted $C_1$-$C_{30}$ alkyl;
more preferably p is an integer in the range of ≥1 to ≤500,
Q is selected from the group consisting of H and methyl, and
G is linear or branched, substituted or unsubstituted $C_1$-$C_{30}$ alkyl;

even more preferably p is an integer in the range of ≥1 to ≤100,
Q is selected from the group consisting of H and methyl, and
G is linear or branched, substituted or unsubstituted $C_1$-$C_{30}$ alkyl;

most preferably p is an integer in the range of ≥1 to ≤50,
Q is selected from the group consisting of H and methyl, and
G is linear or branched, substituted or unsubstituted $C_1$-$C_{30}$ alkyl; and in particular p is an integer in the range of ≥3 to ≤20,
Q is selected from the group consisting of H and methyl, and
G is linear or branched, substituted or unsubstituted $C_1$-$C_{30}$ alkyl.

In another preferred embodiment, the monofunctional polyether amine (B1a) is a primary amine of formula (B1aa) or (B1ab)

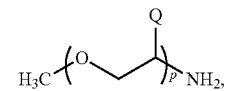

formula (B1aa)

wherein p is an integer in the range of ≥0 to ≤2000, and
Q is selected from the group consisting of H, methyl, ethyl, propyl, isopropyl, n-butyl, isobutyl, tert-butyl and substituted or unsubstituted phenyl;

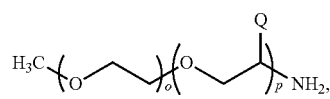

formula (B1ab)

wherein each case o and p are independently of each other an integer in the range of ≥0 to ≤2000,
wherein o+p is an integer in the range of ≥1 to ≤4000, and
Q is selected from the group consisting of H, methyl, ethyl, propyl, isopropyl, n-butyl, isobutyl, tert-butyl and substituted or unsubstituted phenyl;

more preferably, the monofunctional polyether amine (B1) is a primary amine of formula (B1aa) or (B1ab),

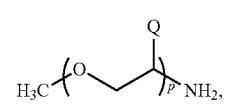

formula (B1aa)

wherein p is an integer in the range of ≥1 to ≤500, and
Q is selected from the group consisting of H and methyl,

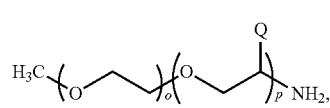

formula (B1ab)

wherein each case o and p are independently of each other an integer in the range of ≥0 to ≤500,
wherein o+p is an integer in the range of ≥1 to ≤1000, and
Q is selected from the group consisting of H and methyl;

most preferably, the monofunctional polyether amine (B1) is a primary amine of formula (B1aa) or (B1ab),

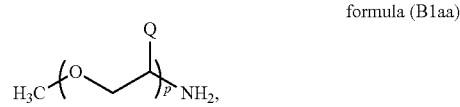

formula (B1aa)

wherein p is an integer in the range of ≥1 to ≤100, and
Q is selected from the group consisting of H and methyl,

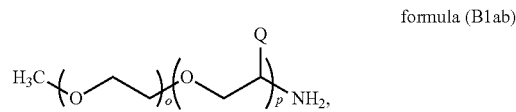

formula (B1ab)

wherein each case o and p are independently of each other an integer in the range of ≥0 to ≤100,
wherein o+p is an integer in the range of ≥1 to ≤200, and
Q is selected from the group consisting of H and methyl.

In a preferred embodiment, the monofunctional polyether amine (B1) is a primary amine of formula (B1aa) or (B1ab),

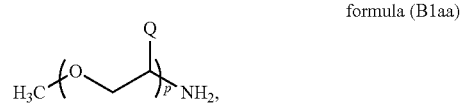

formula (B1aa)

wherein p is an integer in the range of ≥2 to ≤50, and
Q is selected from the group consisting of H and methyl,

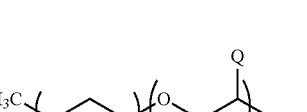

formula (B1ab)

wherein each case o and p are independently of each other an integer in the range of ≥2 to ≤50,
wherein o+p is an integer in the range of ≥2 to ≤100, and
Q is selected from the group consisting of H and methyl; and more preferably, the monofunctional polyether amine (B1) is a primary amine of formula (B1aa) or (B1ab),

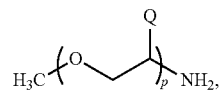

formula (B1aa)

wherein p is an integer in the range of ≥3 to ≤20, and
Q is H,

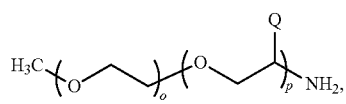

formula (B1ab)

wherein each case o and p are independently of each other an integer in the range of ≥3 to ≤20, wherein o+p is an integer in the range of ≥3 to ≤40; and Q is methyl.

In another preferred embodiment, the compound of formula (B1) is selected from the group consisting of $CH_3$—$(OCH_2CH_2)_{32}$—$(OCH_2CH(CH_3))_{10}$—$NH_2$; $CH_3$—$(OCH_2CH_2)_1$—$(OCH_2CH(CH_3))_9$—$NH_2$; $CH_3$—$(OCH_2CH_2)_{19}$—$(OCH_2CH(CH_3))_3$—$NH_2$; $CH_3$—$(OCH_2CH_2)_6$—$(OCH_2CH(CH_3))_{29}$—$NH_2$; $CH_3$—$(OCH_2CH_2)_{18.6}$—$(OCH_2CH(CH_3))_{1.6}$—$OCH_2CH(CH_3)$—$NH_2$; and $CH_3$—$(OCH_2CH_2)_{31}$—$(OCH_2CH(CH_3))_{10}$—$NH_2$.

In another preferred embodiment, the monofunctional polyether amine (B1) has a weight average molecular weight in the range of ≥120 to ≤10000 g/mol as determined according to GPC. More preferably, the monofunctional polyether amine (B1) has a weight average molecular weight in the range of ≥300 to ≤8000 g/mol as determined according to GPC. Even more preferably, the monofunctional polyether amine (B1) has a weight average molecular weight in the range of ≥200 to ≤5000 g/mol as determined according to GPC. Most preferably, the monofunctional polyether amine (B1) has a weight average molecular weight in the range of ≥300 to ≤4000 g/mol as determined according to GPC and particularly preferably, the monofunctional polyether amine (B1) has a weight average molecular weight in the range of ≥500 to ≤4000 g/mol as determined according to GPC.

In another preferred embodiment, the isocyanate reactive component (B) is a monofunctional polyether alcohol (B2) of formula, $$R_6 \left( O \underset{s}{\frown} \right)_o \left( O \underset{Q}{\frown} \right)_p OH, \quad \text{formula (B2)}$$

wherein o and p are independently of each other an integer in the range of ≥0 to ≤2000, s is an integer in the range of ≥1 to ≤10, wherein o+p is an integer in the range of ≥1 to ≤4000, $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl; and Q is selected from the group consisting of methyl, ethyl, propyl, isopropyl, n-butyl, isobutyl, tert-butyl and substituted or unsubstituted phenyl;

more preferably, the isocyanate reactive component (B) is a monofunctional polyether alcohol (B2) of formula, $$R_6 \left( O \underset{s}{\frown} \right)_o \left( O \underset{Q}{\frown} \right)_p OH, \quad \text{formula (B2)}$$

wherein o and p are independently of each other an integer in the range of ≥0 to ≤500, s is an integer in the range of ≥1 to ≤10, wherein o+p is an integer in the range of ≥1 to ≤1000, $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl; and Q is selected from the group consisting of methyl, ethyl, propyl, isopropyl, n-butyl, isobutyl, tert-butyl and substituted or unsubstituted phenyl;

most preferably, the isocyanate reactive component (B) is a monofunctional polyether alcohol (B2) of formula, $$R_6 \left( O \underset{s}{\frown} \right)_o \left( O \underset{Q}{\frown} \right)_p OH, \quad \text{formula (B2)}$$

wherein o and p are independently of each other an integer in the range of ≥0 to ≤100, s is an integer in the range of ≥1 to ≤10, wherein o+p is an integer in the range of ≥1 to ≤200, $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl, and Q is selected from the group consisting of methyl, ethyl, propyl, isopropyl, n-butyl, isobutyl, tert-butyl and substituted or unsubstituted phenyl; and particular preferably, the isocyanate reactive component (B) is a monofunctional polyether alcohol (B2) of formula, $$R_6 \left( O \underset{s}{\frown} \right)_o \left( O \underset{Q}{\frown} \right)_p OH, \quad \text{formula (B2)}$$

wherein o and p are independently of each other an integer in the range of ≥0 to ≤100, s is an integer in the range of ≥1 to ≤10, wherein o+p is an integer in the range of ≥1 to ≤200, $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl; and Q is methyl.

In another preferred embodiment, the at least one isocyanate reactive component (B) is a monofunctional polyether alcohol (B2) which is selected from formula (B2a) and formula (B2b).

In another preferred embodiment, the formula (B2a) is $$R_6 \left( O \underset{Q}{\frown} \right)_p OH, \quad \text{formula (B2a)}$$

wherein p is an integer in the range of ≥1 to ≤2000;

Q is selected from the group consisting of H, methyl, ethyl, propyl, isopropyl, n-butyl, isobutyl, tert-butyl and substituted or unsubstituted phenyl; and $R_6$ is linear or branched, substituted or unsubstituted $C_1$-$C_{30}$ alkyl, linear or branched, substituted or unsubstituted $C_2$-$C_{30}$ alkenyl and substituted or unsubstituted phenyl;

more preferably p is an integer in the range of ≥1 to ≤500;

Q is selected from the group consisting of H and methyl; and $R_6$ is linear or branched, substituted or unsubstituted $C_1$-$C_{30}$ alkyl, linear or branched, substituted or unsubstituted $C_2$-$C_{30}$ alkenyl and substituted or unsubstituted phenyl;

most preferably p is an integer in the range of ≥1 to ≤100; Q is selected from the group consisting of H and methyl; and $R_6$ is linear or branched, substituted or unsubstituted $C_1$-$C_{30}$ alkyl, linear or branched, substituted or unsubstituted $C_2$-$C_{30}$ alkenyl and substituted or unsubstituted phenyl; and in particularly p is an integer in the range of ≥1 to ≤50; Q is selected from the group consisting of H and methyl; and $R_6$ is linear or branched, substituted or unsubstituted $C_1$-$C_{30}$ alkyl.

In another preferred embodiment, the formula (B2b) is

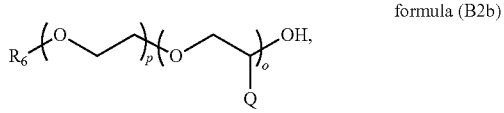

formula (B2b)

wherein p and o are independently of each other an integer in the range of ≥0 to ≤2000, o+p is an integer in the range of ≥1 to ≤4000; Q is selected from the group consisting of H, methyl, ethyl, propyl, isopropyl, n-butyl, isobutyl, tert-butyl and substituted or unsubstituted phenyl; and $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl;

more preferably p and o are independently of each other an integer in the range of ≥0 to ≤500, o+p is an integer in the range of ≥1 to 1000; Q is selected from the group consisting of methyl, ethyl, propyl, isopropyl, n-butyl, isobutyl, tert-butyl and substituted or unsubstituted phenyl; and $R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl;

most preferably wherein p and o are independently of each other an integer in the range of ≥0 to ≤100, o+p is an integer in the range of ≥1 to ≤200; Q is selected from the group consisting of methyl; and $R_6$ is linear or branched, substituted or unsubstituted $C_1$-$C_{30}$ alkyl; and in particularly, p and o are independently of each other an integer in the range of ≥0 to ≤50, o+p is an integer in the range of ≥1 to ≤100; Q is selected from the group consisting of methyl; and $R_6$ is linear or branched, substituted or unsubstituted $C_1$-$C_{30}$ alkyl.

In another preferred embodiment, the monofunctional polyether alcohol (B2) has a weight average molecular weight in the range of ≥150 to ≤10000 g/mol as determined according to GPC. More preferably the monofunctional polyether alcohol (B2) has a weight average molecular weight in the range of ≥150 to ≤6000 g/mol as determined according to GPC. Even more preferably, the monofunctional polyether alcohol (B2) has a weight average molecular weight in the range of ≥150 to ≤5000 g/mol as determined according to GPC. Most preferably the monofunctional polyether alcohol (B2) has a weight average molecular weight in the range of ≥250 to ≤4000 g/mol as determined according to GPC.

In another preferred embodiment, the at least one isocyanate reactive component (B) is a branched or linear, saturated or unsaturated monofunctional alcohol having at least 10 carbon atoms (B3), more preferably, the monofunctional alcohol (B3) is a branched or linear, saturated or unsaturated monofunctional alcohol having 10 to 30 carbon atoms, most preferably, the monofunctional alcohol (B3) is a branched or linear, saturated or unsaturated monofunctional alcohol having 10 to 24 carbon atoms; and in particular preferably, the monofunctional alcohol (B3) is a branched or linear, saturated or unsaturated monofunctional alcohol having 10 to 18 carbon atoms.

In another preferred embodiment, the compound of formula (B3) is selected from the group consisting of decanol, undecanol, dodecanol, tridecanol, tetradecanol, pentadecanol, hexadecanol, heptadecanol, octadecanol, nonadecanol, icosanol, henicasanol, docosanol, decan-2-ol, undecane-2-ol, dodecan-2-ol, tridecan-2-ol, tetradecane-2-ol, pentadecan-2-ol, hexadecan-2-ol, heptadecan-2-ol, octadecan-2-ol, nonadecan-2-ol, icosan-2-ol, henicasan-2-ol, docosan-2-ol, decan-3-ol, undecan-3-ol, dodecan-3-ol, tridecan-3-ol, tetradecan-3-ol, pentadecan-3-ol, hexadecan-3-ol, heptadecan-3-ol, octadecan-3-ol, nonadecan-3-ol, icosan-3-ol, henicasan-3-ol, docosan-3-ol, decan-4-ol, undecan-4-ol, dodecan-4-ol, tridecan-4-ol, tetradecan-4-ol, pentadecan-4-ol, hexadecan-4-ol, heptadecan-4-ol, octadecan-4-ol, nonadecan-4-ol, icosan-4-ol, henicasan-4-ol, docosan-4-ol, stearyl alcohol, palmitoleyl alcohol, oleyl alcohol and erucyl alcohol.

In another preferred embodiment, the at least one isocyanate reactive component (B) is a monofunctional polyester alcohol (B4). The monohydroxyl polyester alcohol can contain at least one —COO-group, polyesters or mixed polyether-polyesters. The monohydroxyl polyester alcohol is obtained by the polymerisation of a lactone such as propiolactone, valerolactone, caprolactone or substituted derivatives thereof, using a monohydroxyl starting component. The starting components used can be saturated or unsaturated monohydric alcohols, preferably with 4 to 40, more preferably 10 to 40 carbon atoms, even more preferably 10 to 30 carbon atoms. The monohydric alcohols are selected from, but not limited to, n-butanol, saturated and unsaturated alcohols such as propargyl alcohol, oleyl alcohol, lineloyl alcohol, oxo alcohols, cyclohexanol, phenyl ethanol or neopentyl alcohol or fluorinated alcohols and substituted and unsubstituted phenols can also be converted into polyoxyalkylene monoalkyl-, aryl-, aralkyl- or cycloalkyl ethers by known methods of alkoxylation with ethylene oxide and/or propylene oxide, and these monohydroxypolyethers can be used as starting components for the lactone polymerisation to obtain monohydroxyl polyester alcohol (B4). In another preferred embodiment, the propiolactone, the valerolactone and the caprolactone is polymerised with monohydroxy $C_{10}$-$C_{30}$ alcohol to obtain the monohydroxyl polyester alcohol (B4).

In another preferred embodiment, the reaction of at least one isocyanate (A) comprising at least one allophanate group and at least one active double bond and at least one isocyanate reactive component (B) to form an intermediate product (C) is performed at a reaction temperature in the range from ≥0 to ≤280° C., more preferably from ≥20 to ≤250° C., in the presence or absence of a catalyst and in the presence or absence of a solvent.

In another preferred embodiments, the intermediate product (C) is prepared in the presence of at least one inert solvent, which is selected from the group consisting acetone, methyl ethyl ketone, tetrahydrofuran, dioxane, dichloromethane, toluene, xylene and, $C_1$-$C_4$-alkyl esters of acetic acid, such as ethyl acetate, propyl acetate butyl acetate, butyl carbitol acetate ether solvents such as methylisobutyl ether, glycol ether acetate, and mineral oil, mineral spirit, natural oil, methyl amyl ketone, ethyl cellosolve, cyclohexane, dimethyl formamide, dimethylsulfoxide, N-methyl pyrrolidone and mixtures thereof.

In another preferred embodiment, the intermediate product (C) obtained in step a. has the NCO content <0.2 wt. %, related to the overall weight of the intermediate product (C). More preferably, the intermediate product (C) obtained in step a. has the NCO content <0.1 wt. %, related to the overall weight of the intermediate product (C), even more preferably, the intermediate product (C) obtained in step a. has the NCO content <0.05 wt. %, related to the overall weight of the intermediate product (C), most preferably, the intermediate product (C) obtained in step a. has the NCO content <0.01 wt. %, related to the overall weight of the intermediate product (C) and in particular preferably the intermediate product (C) obtained in step a. is free of NCO content.

In another preferred embodiment, the intermediate product (C) obtained is reacted with at least one active double bond reactive component (D) to obtain the copolymer.

Component (D)

In a preferred embodiment, the at least one active double bond reactive component (D) is a primary amine or a secondary amine. The primary amine and secondary amine preferably contain a heterocyclic ring selected from the group consisting of imidazole, 1H-1,2,3-triazol, 4H-1,2,4-triazole, 1H-tetrazol, piperazine, pyrimidine, morpholine, benzimidazole, pyridine, benzothiazole, imidazolidin-2-one, benzylamine, and aniline.

In a preferred embodiment, the at least one active double bond reactive component (D) is selected from the group consisting of imidazole, 1H-imidazol-1-amine, (1H-imidazol-1-yl)methanamine, (1H-imidazol-1-yl)ethan-1-amine, 3-(1H-imidazol-1-yl)propan-1-amine, 4-(1H-imidazol-1-yl)butan-1-amine, 5-(1H-imidazol-1-yl)pentan-1-amine, N-ethyl-2-(1H-imidazol-1-yl)ethan-1-amine, (1H-imidazol-1-yl)methanethiol, 2-(1H-imidazol-1-yl)ethane-1-thiol, 3-(1H-imidazol-1-yl)propane-1-thiol, 4-(1H-imidazol-1-yl)butane-1-thiol, (1H-1,2,3-triazol-1-yl)methanamine, 1H-1,2,3-triazole, 2-(1H-1,2,3-triazol-1-yl)ethan-1-amine, 3-(1H-1,2,3-triazol-1-yl)propan-1-amine, 4-(1H-1,2,3-triazol-1-yl)butan-1-amine, 5-(1H-1,2,3-triazol-1-yl)pentan-1-amine, (1H-1,2,3-triazol-1-yl)methanethiol, 2-(1H-1,2,3-triazol-1-yl)ethane-1-thiol, 3-(1H-1,2,3-triazol-1-yl)propane-1-thiol, 4-(1H-1,2,3-triazol-1-yl)butane-1-thiol, 5-(1H-1,2,3-triazol-1-yl)pentane-1-thiol, 4H-1,2,4-triazole, (4H-1,2,4-triazol-4-yl)methanamine, 2-(4H-1,2,4-triazol-4-yl)ethan-1-amine, 3-(4H-1,2,4-triazol-4-yl)propan-1-amine, 4-(4H-1,2,4-triazol-4-yl)butan-1-amine, 5-(4H-1,2,4-triazol-4-yl)pentan-1-amine, (4H-1,2,4-triazol-4-yl)methanethiol, 2-(4H-1,2,4-triazol-4-yl)ethane-1-thiol, 3-(4H-1,2,4-triazol-4-yl)propane-1-thiol, 4-(4H-1,2,4-triazol-4-yl)butane-1-thiol, 5-(4H-1,2,4-triazol-4-yl)pentane-1-thiol, (1H-tetrazol-1-yl)methanamine, 2-(1H-tetrazol-1-yl)ethan-1-amine, 3-(1H-tetrazol-1-yl)propan-1-amine, 4-(1H-tetrazol-1-yl)butan-1-amine, N-methyl-4-(1H-tetrazol-1-yl)butan-1-amine, 5-(1H-tetrazol-1-yl)pentan-1-amine, (1H-tetrazol-1-yl)methanethiol, 2-(1H-tetrazol-1-yl)ethane-1-thiol, 3-(1H-tetrazol-1-yl)propane-1-thiol, 4-(1H-tetrazol-1-yl)butane-1-thiol and 5-(1H-tetrazol-1-yl)pentane-1-thiol, N,N-diethyl-1,4-butanediamine, 1-(2-aminoethyl)piperazine, 2-(1-pyrrolidyl)-ethylamine, 4-amino-2-methoxy-pyrimidine, 2-dimethylaminoethanol, 1-(2-hydroxyethyl)piperazine, 4-(2-hydroxyethyl)morpholine, 2-mercaptopyrimidine, 2-mercaptobenzimidazole, N,N-dimethyl-1,3-propanediamine, 4-(2-aminoethyl)pyridine, 2-amino-6-methoxy-benzothiazole, 4-aminomethyl-pyridine, N,N-diallylmelamine, 3-amino-1,2,4-triazole, 1-(3-aminopropyl)imidazole, 4-(2-hydroxyethyl)pyridine, 1-(2-hydroxyethyl)imidazole and 3-mercapto-1,2,4-triazole, 1-(2-Aminoethyl)imidazolidin-2-one, benzylamine, aniline and branched or linear $(C_2H_5N)_{1-500}$ and salts thereof.

In another preferred embodiment, the copolymer is obtained by:
a. reacting an isocyanate (A) (1 mole eq.) of formula

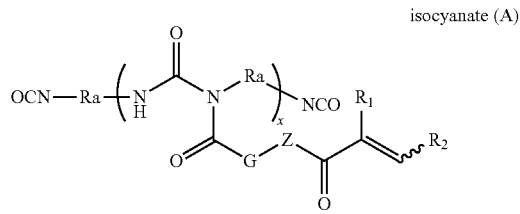

isocyanate (A)

wherein x is a positive number which mean average is from 1 to 5, preferably from 1 to 3,
Ra is —$(CH_2)_6$—, G is —O—, Z is —$CH_2$—$CH_2$—, $R_1$ and $R_2$ are H;
with a monofunctional primary amine polyetheramine copolymer with EO/PO backbone having a weight average molecular weight Mw in the range of 500 g/mol to 3000 g/mol (B) (1 to 1.1 mole eq. based on NCO content in the isocyanate (A)) to form an intermediate product (C); and
b. reacting the intermediate product (C) obtained in step a. with N-(3-aminopropyl)-imidazole (D) (0.2 mole eq. to 1.0 mol eq. based on double in the isocyanate (A)) to obtain the copolymer.

In another preferred embodiment, the copolymer is prepared by a process comprising the steps of:
i) mixing at least one isocyanate (A) comprising at least one allophanate group and at least one active double bond, with at least one isocyanate reactive component (B) to obtain a mixture;
ii) heating the mixture obtained in step a. to a desired temperature to obtain an intermediate product (C);
iii) mixing the intermediate product (C) obtained in step b. with at least one active double bond reactive component (D) to obtain a mixture; and
iv) heating the mixture obtained in step c. to a desired temperature to obtain the copolymer;
more preferably, the copolymer is prepared by a process comprising the steps of:
i) mixing at least one isocyanate (A) comprising at least one allophanate group and at least one active double bond with at least one isocyanate reactive component (B) selected from the group consisting of monofunctional polyether amine (B1), monofunctional polyether alcohol (B2), $C_6$-$C_{30}$ monofunctional alcohol (B3) and monofunctional polyester alcohol (B4) to obtain a mixture;
ii) heating the mixture obtained in step a. to a desired temperature to obtain an intermediate product (C);
iii) mixing the intermediate product (C) obtained in step b. with at least one active double bond reactive component (D) to obtain a mixture; and iv) heating the mixture obtained in step c. to a desired temperature to obtain the copolymer;

even more preferably, the copolymer is prepared by a process comprising the steps of:

i) mixing at least one isocyanate (A) comprising at least one allophanate group and at least one active double bond with at least one isocyanate reactive component (B) selected from the group consisting of monofunctional polyether amine (B1), monofunctional polyether alcohol (B2) and $C_6$-$C_{30}$ monofunctional alcohol (B3) to obtain a mixture;

ii) heating the mixture obtained in step a. to a desired temperature to obtain an intermediate product (C);

iii) mixing the intermediate product (C) obtained in step b. with at least one active double bond reactive component (D) to obtain a mixture; and iv) heating the mixture obtained in step c. to a desired temperature to obtain the copolymer;

most preferably, the copolymer is prepared by a process comprising the steps of:

i) mixing at least one isocyanate (A) comprising at least one allophanate group and at least one active double bond with at least one isocyanate reactive component (B) selected from the group consisting of monofunctional polyether amine (B1) and monofunctional polyether alcohol (B2) to obtain a mixture;

ii) heating the mixture obtained in step a. to a desired temperature to obtain an intermediate product (C);

iii) mixing the intermediate product (C) obtained in step b. with at least one active double bond reactive component (D) to obtain a mixture; and iv) heating the mixture obtained in step c. to a desired temperature to obtain the copolymer; and particularly preferably, the copolymer is prepared by a process comprising the steps of:

i) mixing at least one isocyanate (A) comprising at least one allophanate group and at least one active double bond with at least one monofunctional polyether amine (B1) to obtain a mixture;

ii) heating the mixture obtained in step a. to a desired temperature to obtain an intermediate product (C);

iii) mixing the intermediate product (C) obtained in step b. with at least one active double bond reactive component (D) to obtain a mixture; and iv) heating the mixture obtained in step c. to a desired temperature to obtain the copolymer;

wherein the at least one active double bond reactive component (D) is selected from primary amine and secondary amine.

In a preferred embodiment, the reaction temperature in step ii) to obtain the intermediate (C) is in the range from ≥0 to ≤150° C., more preferably in the range from ≥20 to ≤130° C., in the presence or absence of a catalyst and in the presence or absence of a solvent.

In another preferred embodiment, the molar ratio between the at least one isocyanate (A) to the at least one isocyanate reactive component (B) is in the range of 1.0:1.0 to 1.0:5.0; more preferably, the molar ratio between the at least one isocyanate (A) to the at least one isocyanate reactive component (B) is in the range of 1.0:1.0 to 1.0:3.0; even more preferably, the molar ratio between the at least one isocyanate (A) to the at least one isocyanate reactive component (B) is in the range of 1.0:1.0 to 1.0:2.0; most preferably, the molar ratio between the at least one isocyanate (A) to the at least one isocyanate reactive component (B) is in the range of 1.0:1.0 to 1.0:1.5; and in particular, the molar ratio between the at least one isocyanate (A) to the at least one isocyanate reactive component (B) is in the range of 1.0:1.0 to 1.0:1.1;

In a preferred embodiment, the reaction temperature in step iv) to obtain the copolymer is in the range from ≥0 to ≤150° C., more preferably from ≥20 to ≤120° C., in the presence or absence of at least one solvent.

In another preferred embodiment, the molar ratio between the intermediate (C) to the at least one active double bond reactive component (D) is in the range of 1.0:0.1 to 1.0:2.0, more preferably is in the ratio of 1.0:0.2 to 1.0:1.0.

In another preferred embodiment, the process for the preparation of the copolymer from step i) to step iv) is carried in presence of at least one solvent.

In another preferred embodiment, the at least one solvent is an inert solvent selected from the group consisting acetone, methyl ethyl ketone, tetrahydrofuran, dioxane, dichloromethane, toluene, xylene and $C_1$-$C_4$-alkyl esters of acetic acid, such as ethyl acetate, propyl acetate, butyl acetate, butyl carbitol acetate ether solvents such as methylisobutyl ether, glycol ether acetate, and mineral oil, mineral spirit, natural oil, methyl amyl ketone, ethyl cellosolve, cyclohexane, dimethyl formamide, dimethylsulfoxide, N-methyl pyrrolidone and mixtures thereof.

In another preferred embodiment, a liquid composition is in the form of a dispersion comprising at least one copolymer and a particulate solid material selected from the group consisting of pigments and fillers and a liquid diluent, wherein the particulate solid material is dispersed in the liquid diluent. The at least one copolymer is as defined as above. The pigments are selected from the organic or the inorganic pigments.

In a preferred embodiment, the invention relates in particular to a liquid composition in the form of a liquid coating composition, which comprises a particulate solid material, in particular a pigment or a filler and at least one copolymer as defined above, which is dispersed in a liquid diluent.

In a preferred embodiment, the invention also relates in particular to a liquid composition in the form of a liquid ink composition, which comprises a particulate solid material, in particular a pigment or a filler, and at least one copolymer as defined as above, which is dispersed in a liquid diluent.

In a preferred embodiment, the invention also relates in particular to a liquid composition in the form of a liquid ink composition, which comprises a particulate solid material, in particular a pigment or a filler, and at least one copolymer as fined above, which is dispersed in a liquid diluent.

In a preferred embodiment, the suitable solid particular materials include, but are not limited to, the group consisting of pigments and fillers. The pigments comprise inorganic or an organic pigment. The pigments can include the colored pigments and the pearlescent flakes.

In a preferred embodiment, the size of the particulate material is preferably in the micrometre range, e.g. the weight average particle diameter is in the range from 1 μm to 2000 μm, in particular form 2 μm to 1000 μm or from 5 μm to 500 μm. The weight average particle diameter can be determined by the sieving analysis. The weight average particle diameter can also be determined by the light scattering methods.

Examples of the suitable organic pigments are the pigments and the pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrroles, and carbazoles, e.g. carbazole violet, and the like. Further examples of the organic pigments can be found in the monograph: W. Herbst, K. Hunger "Industrielle Organische Pigmente" 2nd Edition, 1995, VCH Verlagsgesellschaft, ISBN: 3-527-28744-2.

Examples of the suitable inorganic pigments are the metallic flakes, such as aluminium, aluminium oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

In a preferred embodiment, the suitable fillers are calcium carbonate, silicates, glass fibres, glass beads, talc, kaolin, mica, barium sulphate, metal oxides and hydroxides, carbon black, graphite, wood powders, powders and fibres of other natural products and synthetic fibres.

In a preferred embodiment, the selection of the liquid diluent that is present in the dispersion will depend on the field of application in a known manner. The dispersants of the invention are particular useful in dispersions, where the diluent is selected from commonly used solvents in coatings technology. For water based formulations the diluent comprises water and may, aside from water, further comprise polar, water-miscible solvents, such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate and mixtures thereof are used as liquid diluents.

In a preferred embodiment, the weight ratio of the particulate solid material to the at least one copolymer is in the range from ≥100:1 to ≤1:50, more preferably from 50:1 to 1:30, and even more preferably from 30:1 to 1:10.

In an embodiment, the liquid composition comprises
a) ≥1 to ≤70% by weight, based on the total weight of the liquid composition, of the at least one particulate solid material selected from the group consisting of the pigments and the fillers;
b) ≥0.5 to ≤50% by weight, based on the total weight of the liquid composition, of the at least one copolymer as defined above; and
c) ≥10 to ≤98.5% by weight, based on the total weight of the liquid composition, of the at least one liquid diluent.

In a preferred embodiment, the liquid composition may further comprise binders and/or one or more conventional additives depending on the intended use. Conventional additives include e.g. plasticisers, lubricants, emulsifiers, humectants, rheology additives, catalysts, flow auxiliaries, optical brighteners, flame retardants, preservatives, antistatic agents or blowing agents.

In a preferred embodiment, the liquid dispersion may be in the form of a millbase. Such a millbase contains the particulate solid, the copolymer and the liquid diluent and optionally additives, but generally the millbase will not contain binders.

In a preferred embodiment, the liquid dispersion may also be in the form of a coating composition. Such a coating composition contains the particulate solid, the at least one copolymer as defined above and the liquid diluent and additionally one or more binders, e.g. film-forming polymers or prepolymers which form a film upon curing. The coating composition may optionally contain conventional additives that are used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of a coating composition. Such a coating composition contains the particulate solid, the at least one copolymer and the liquid diluent and additionally one or more binders, e.g. film-forming polymers or prepolymers which form a film upon curing. Coating composition may optionally contain conventional additives that are used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of a coating composition. Such a coating composition contains the particulate solid, the at least one copolymer as defined above and the liquid diluent and additionally one or more binders, e.g. film-forming polymers or prepolymers which form a film upon curing. The coating composition may optionally contain conventional additives used in the coating technology, e.g. plasticisers, lubricants, emulsifiers, rheology additives, catalysts, flow auxiliaries, optical brighteners, flame retardants, preservatives, antistatic agents or blowing agents.

In a preferred embodiment, the liquid dispersion may also be in the form of an ink, e.g. a printing ink or a gravure ink. Such an ink contains the particulate solid, the at least one copolymer as defined above and the liquid diluent and additionally one or more binders conventionally used in the ink technology, e.g. film-forming polymers or prepolymers which form a film upon curing. The coating composition may optionally contain conventional additives, e.g. plasticisers, lubricants, emulsifiers, humectants, rheology additives, humectants, preservatives and antistatic agents.

The suitable binders are the ones customarily used, for example the ones described in Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin, preferably on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in Ullmann's, Vol. A18, loc. cit., p. 469.

In another preferred embodiment, the coating compositions comprise a copolymer as defined above and a cross linkable resin. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a tri-salkoxycarbonyl triazine cross linker and a hydroxyl group containing resin such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

In another preferred embodiment, the coating composition preferably comprises 0.01 to 100.0 percentage by weight of the combined components a) and b), i.e. particulate solid and the at least one copolymer in the composition, in particular 0.05 to 50.0 w %, especially 0.1 to 20.0 w %, per 100 percentage by weight of solid binder.

In another preferred embodiment, the coating composition preferably comprises 0.01 to 100.0 percentage by weight of the combined components a) and b), i.e. particulate solid and the at least one copolymer, in particular 0.05 to 50.0 percentage by weight, especially 0.1 to 20.0 percentage by weight, per 100 percentage by weight of solid binder.

In a preferred embodiment, the pigments are generally dispersed in the liquid diluent in the presence of the at least on copolymer as defined as above. The dispersion can be achieved by using conventional techniques, such as high speed mixing, ball milling, sand grinding, attritor grinding or two or three roll milling. The resulting pigment dispersion may have a pigment to dispersant weight ratio in the above range. Thus the obtained dispersion is also termed as a millbase.

In a preferred embodiment, the pigments are generally dispersed in the liquid diluent in the presence of the at least one copolymer. The dispersion can be achieved by using conventional techniques, such as high speed mixing, ball milling, sand grinding, attritor grinding or two or three roll milling. The resulting pigment dispersion may have a pigment to dispersant weight ratio in the above range. Thus the obtained dispersion is also termed as a millbase.

In another preferred embodiment, the method for preparing the coating composition or an ink the millbase will generally be incorporated, e.g. by mixing, into a liquid composition of the binder. It is, however, also possible to disperse the particulate solid in a solution of the at least one copolymer, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of the particulate solid and the at least one copolymer as defined above is easy to disperse and does not require time and energy intensive grinding to be incorporated into e.g. a paint formulation.

In another preferred embodiment, the method for preparing the coating composition or an ink the millbase will generally be incorporated, e.g. by mixing, into a liquid composition of the binder. It is, however, also possible to disperse the particulate solid in a solution of the at least one copolymer, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of particulate solid and the at least one copolymer is easy to disperse and does not require time and energy intensive grinding to be incorporated into e.g. a paint formulation.

In another aspect, the presently claimed invention is directed to the use of the at least one copolymer as defined as above as a dispersant for particulate solid material selected from the group consisting of pigments and fillers.

The presently claimed invention offers one or more of the following advantages:

1. The presently claimed invention provides a dispersant prepared by
   a. reacting at least one isocyanate (A) comprising at least one allophanate group and at least one active double bond with at least one isocyanate reactive component (B) to form an intermediate product (C); and
   b. reacting the intermediate product (C) obtained in step a. with at least one active double bond reactive component (D) to obtain the copolymer;
   wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

2. The copolymer displayed beneficial properties such as superior pigment affinity, improved rheology behaviour, improved gloss of surface coatings, justness and undertone, when being used in coating compositions.

In the following, specific embodiments of the presently claimed invention are described:

1. A copolymer obtained by:
   a. reacting at least one isocyanate (A) comprising at least one allophanate group and at least one active double bond with at least one isocyanate reactive component (B) to form an intermediate product (C); and b. reacting the intermediate product (C) obtained in step a. with at least one active double bond reactive component (D) to obtain the copolymer;
  wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

2. The copolymer according to embodiment 1, wherein the at least one isocyanate (A) comprising at least one allophanate group and at least one active double bond contains 1, 2, 3, 4, 5, 6, 7, 8, 9 or 10 NCO groups.

3. The copolymer according to embodiment 1, wherein the at least one isocyanate (A) comprising at least one allophanate group and at least one active double bond is obtained by reacting at least one polyisocyanate (A1) with at least one compound of formula (A2),

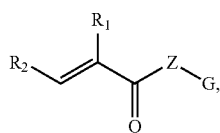

formula (A2)

wherein Z is selected from the group consisting of —O—, —NR$_5$— and —S—;
$R_1$ and $R_2$ are independently of each other selected from the group consisting of H, linear or branched, substituted or unsubstituted $C_1$-$C_{30}$ alkyl, linear or branched, substituted or unsubstituted $C_2$-$C_{30}$ alkenyl and substituted or unsubstituted phenyl;
G is selected from the group consisting of —(CH$_2$)$_k$—OH, —(CH$_2$—CH$_2$—O)$_m$H, —(—CH(R$^3$)—CH(R$^4$)—O—)$_n$—H, —CH$_2$—CH(OH)—CH$_2$—O—C(=O)—C(CH$_3$)=CH$_2$ and —CH$_2$—CH(OH)—CH$_2$—O—C(=O)—CH=CH$_2$;
k, m and n are independently of each other an integer in the range of ≥1 to ≤20;
$R_3$ and $R_4$ are independently of each other selected from the group consisting of H, methyl, ethyl, propyl, isopropyl, n-butyl, isobutyl and tert-butyl; and
$R_5$ is selected from the group consisting of H, linear or branched, substituted or unsubstituted $C_1$-$C_{30}$ alkyl, linear or branched, substituted or unsubstituted $C_2$-$C_{30}$ alkenyl, and substituted or unsubstituted phenyl.

4. The copolymer according to embodiment 3, wherein the at least one polyisocyanate (A1) is selected from the group consisting of 4,4'-diphenylmethanediisocyanate, toluene diisocyanate, naphthylene-1,5-diisocyanate, 1,3- or 1,4-phenylene-diisocyanate, triphenylmethane-4,4',4"-triisocyanate, poly phenyl-polymethylene polyisocyanate, hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6-hexahydrotolyene-diisocyanate, hexahydro-1,3- or -1,4-phenyidiisocyanate and perhydro-2,4'- or -4,4'-dicyclohexylmethanediisocyanate.

5. The copolymer according to embodiment 3, wherein the at least one compound of formula (A2) is selected from the group consisting of hydroxy acrylate (A2a) and hydroxy acrylamide (A2b).

6. The copolymer according to anyone of the preceding embodiments, wherein the at least one isocyanate (A) has active double bonds in the range from ≥1 to ≤10.

7. The copolymer according to anyone of the preceding embodiments, wherein the at least one active double bond is a double bond which is conjugated with at least one carbonyl group.

8. The copolymer according to embodiment 1 to 7, wherein the monofunctional polyether amine (B1) of formula (B1),

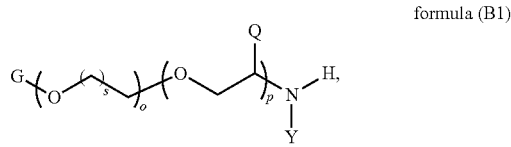

formula (B1)

wherein Y is selected from the group consisting of H, linear or branched, substituted or unsubstituted $C_1$-$C_{30}$ alkyl, and G-(O(CH$_2$)$_s$CH$_2$)$_o$—(CH$_2$—CH(Q))$_p$-;
o and p are independently of each other an integer in the range of ≥0 to ≤2000;
s is an integer in the range of ≥1 to ≤10;
wherein o+p is in the range of ≥1 to ≤4000; and
Q and G are independently of each other selected from the group consisting of methyl, ethyl, propyl, isopropyl, n-butyl, isobutyl, tert-butyl and substituted or unsubstituted phenyl.

9. The copolymer according to embodiment 1 to 8, wherein the monofunctional polyether amine (B1) has a weight average molecular weight in the range of ≥120 to ≤10000 g/mol, as determined according to GPC.

10. The copolymer according to embodiment 1 to 7, wherein the monofunctional polyether alcohol (B2) of formula (B2),

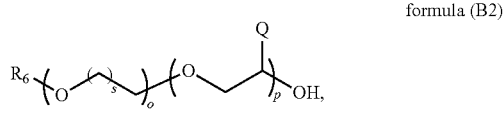

formula (B2)

wherein o and p are independently of each other an integer in the range of ≥0 to ≤2000;
s is an integer in the range of ≥1 to ≤10;
wherein o+p is in the range of ≥1 to ≤4000;
$R_6$ is selected from the group consisting of linear or branched, substituted or unsubstituted $C_1$-$C_{30}$ alkyl, linear or branched, substituted or unsubstituted $C_2$-$C_{30}$ alkenyl and substituted or unsubstituted phenyl; and
Q is selected from the group consisting of methyl, ethyl, propyl, isopropyl, n-butyl, isobutyl, tert-butyl and substituted or unsubstituted phenyl.

11. The copolymer according to embodiments 1 to 10, wherein the monofunctional polyether alcohol (B2) has a weight average molecular weight in the range of ≥150 to ≤10000 g/mol, as determined according to GPC.

12. The copolymer according to embodiment 1, wherein the intermediate product (C) obtained in step a. is free of NCO groups.

13. The copolymer according to embodiment 1, wherein the at least one active double bond reactive component (D) is selected from the group consisting of imidazole, 1H-imidazol-1-amine, (1H-imidazol-1-yl)methanamine, (1H-imidazol-1-yl)ethan-1-amine, 3-(1H-imidazol-1-yl)propan-1-amine, 4-(1H-imidazol-1-yl)butan-1-amine, 5-(1H-imidazol-1-yl)pentan-1-amine, N-ethyl-2-(1H-imidazol-1- yl)ethan-1-amine, (1H-imidazol-1-yl)methanethiol, 2-(1H-imidazol-1-yl)ethane-1-thiol, 3-(1H-imidazol-1-yl)propane-1-thiol, 4-(1H-imidazol-1-yl)butane-1-thiol, (1H-1,2,3-triazol-1-yl)methanamine, 1H-1,2,3-triazole, 2-(1H-1,2,3-triazol-1-yl)ethan-1-amine, 3-(1H-1,2,3-triazol-1-yl)propan-1-amine, 4-(1H-1,2,3-triazol-1-yl)butan-1-amine, 5-(1H-1,2,3-triazol-1-yl)pentan-1-amine, (1H-1,2,3-triazol-1-yl)methanethiol, 2-(1H-1,2,3-triazol-1-yl)ethane-1-thiol, 3-(1H-1,2,3-triazol-1-yl)propane-1-thiol, 4-(1H-1,2,3-triazol-1-yl)butane-1-thiol, 5-(1H-1,2,3-triazol-1-yl)pentane-1-thiol, 4H-1,2,4-triazole, (4H-1,2,4-triazol-4-yl)methanamine, 2-(4H-1,2,4-triazol-4-yl)ethan-1-amine, 3-(4H-1,2,4-triazol-4-yl)propan-1-amine, 4-(4H-1,2,4-triazol-4-yl)butan-1-amine, 5-(4H-1,2,4-triazol-4-yl)pentan-1-amine, (4H-1,2,4-triazol-4-yl)methanethiol, 2-(4H-1,2,4-triazol-4-yl)ethane-1-thiol, 3-(4H-1,2,4-triazol-4-yl)propane-1-thiol, 4-(4H-1,2,4-triazol-4-yl)butane-1-thiol, 5-(4H-1,2,4-triazol-4-yl)pentane-1-thiol, (1H-tetrazol-1-yl)methanamine, 2-(1H-tetrazol-1-yl)ethan-1-amine, 3-(1H-tetrazol-1-yl)propan-1-amine, 4-(1H-tetrazol-1-yl)butan-1-amine, N-methyl-4-(1H-tetrazol-1-yl)butan-1-amine, 5-(1H-tetrazol-1-yl)pentan-1-amine, (1H-tetrazol-1-yl)methanethiol, 2-(1H-tetrazol-1-yl)ethane-1-thiol, 3-(1H-tetrazol-1-yl)propane-1-thiol, 4-(1H-tetrazol-1-yl)butane-1-thiol and 5-(1H-tetrazol-1-yl)pentane-1-thiol, N,N-diethyl-1,4-butanediamine, 1-(2-aminoethyl)piperazine, 2-(1-pyrrolidyl)-ethylamine, 4-amino-2-methoxy-pyrirnidine, 2-dimethylaminoethanol, 1-(2-hydroxyethyl)piperazine, 4-(2-hydroxyethyl)morpholine, 2-mercaptopyrimidine, 2-mercaptobenzimidazole, N,N-dimethyl-1,3-propanediamine, 4-(2-aminoethyl)pyridine, 2-amino-6-methoxy-benzothiazole, 4-aminomethylpyridine, N,N-diallylmelamine, 3-amino-1,2,4-triazole, 1-(3-aminopropyl)imidazole, 4-(2-hydroxyethyl)pyridine, 1-(2-hydroxyethyl)imidazole and 3-mercapto-1,2,4-triazole, 1-(2-aminoethyl)imidazolidin-2-one, benzylamine, aniline, branched or linear $(C_2H_5N)_{1-500}$ and salts thereof.

14. The copolymer according to embodiment 1 to 13, wherein the copolymer has weight average molecular weight $M_w$ in the range of ≥1000 g/mol to ≤100000 g/mol, as determined according to GPC.

15. A method for preparing a copolymer according to any one of the preceding embodiments, wherein the process comprises the steps of:
i) mixing at least one isocyanate (A) comprising at least one allophanate group and at least one active double bond, with at least one isocyanate reactive component (B) to obtain a mixture;
ii) heating the mixture obtained in step a. to a desired temperature to obtain an intermediate product (C);
iii) mixing the intermediate product (C) obtained in step b. with at least one active double bond reactive component (D) to obtain a mixture; and
iv) heating the mixture obtained in step c. to a desired temperature to obtain the copolymer;
wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

16. The method according to embodiment 15, wherein the step ii) is conducted at a temperature in the range of ≥20 to ≤150° C.

17. The method according to embodiments 15 to 16, wherein the steps i) to iv) are conducted in the presence or in the absence of at least one solvent.

18. The method according to embodiment 17, wherein the at least one solvent is selected from the group consisting of ketones, esters, aromatic solvents, aliphatic solvents, cyclic ethers, ethers and mixtures thereof.

19. The method according to embodiments 15 to 18, wherein the step iv) is conducted at a temperature in the range of ≥20 to ≤150° C.

20. A liquid composition in the form of a dispersion comprising, the copolymer according to one or more of embodiments 1 to 14 or the copolymer obtained according to method of embodiments 15 to 19 and a particulate solid material selected from the group consisting of pigments and fillers and a liquid diluent, wherein the particulate solid material is dispersed in the liquid diluent selected from organic solvent or water or mixture from both.

21. The liquid composition according to embodiment 20, wherein the weight ratio of the particulate solid material to the copolymer according to embodiments 1 to 15 or the copolymer obtained according to method of embodiments 16 to 20 is in the range from ≥100:1 to ≤1:50.

22. The liquid composition according to embodiment 20 or 21, comprising
a) ≥1 to ≤70% by weight, based on the total weight of the liquid composition, of at least one particulate solid material, selected from the group consisting of pigments and fillers;
b) ≥0.5 to ≤50% by weight, based on the total weight of the liquid composition, of the copolymer according to one or more of embodiments 1 to 14 or the copolymer obtained according to method of embodiments 15 to 19; and
c) ≥10 to ≤98.5% by weight, based on the total weight of the liquid composition, of at least one liquid diluent.

24. The liquid composition according to embodiment 22, which is in the form of a millbase, a coating composition or an ink.

25. Use of the copolymer according to one or more of embodiments 1 to 14 or the copolymer obtained according to method of embodiments 15 to 19 and the salts thereof as a dispersant for particulate solid material selected from the group consisting of pigments and fillers.

EXAMPLES

The presently claimed invention is further illustrated in combination with the following examples. These examples are provided to exemplify the presently claimed invention, but are not intended to restrict the scope of the presently claimed invention in any way. The below listed chemicals are used and all are commercially available.

Materials

Basonat HI 100® (available from BASF SE) are polyisocyanates based on isocyanurated hexamethylene diisocyanate.

Laromer PR 9000® (available from BASF SE) is a low-viscous, polyisocyanate, unsaturated acrylic ester resin, based on allophanated hexamethylene diisocyanate. It has NCO content in the range of 14.5 to 15.5%.

Jeffamine M2070® (available from Huntsman Corporation) is a monofunctional primary amine polyetheramine containing 10 PO (propylene oxide) and 31 EO (ethylene oxide) with a weight average molecular weight in the range of 1500 g/mol to 3000 g/mol.

N-(3-aminopropyl)-imidazole available from BASF SE.

The molecular weight was calculated using GPC method. The instrument was used is 1260 Infinity von Agilent using polystyrene as internal standard for calibration. The flow rate of the eluent was 1 mL/min at 70 to 85 bar pressure. The column temperature was maintained at around 40° c.

Comparative Examples 1-5

Jeffamine M2070® (1 eq based on NCO) and aminopropyl imidazole (0.1 to 0.5 eq. based on NCO) were charged to a 500 mL reaction flask. The isocyanurate intermediate (Basonate HI100®) was added over a period of 5 minutes. The reaction mixture was heated to 50 to 60° C. and allowed to react until complete consumption of NCO to obtain the dispersant.

Examples 6 to 13

Jeffamine M2070® (1 to 1.1 eq based on NCO) was charged to a 500 mL reaction flask. The allophanate intermediate (Laromer PR 9000®) was charged over a period of 5 minutes to this compound. The reaction mixture was heated to 50 to 60° C. and allowed to react until complete consumption of NCO. Aminopropyl imidazole (0.25 to 0.90 eq. based on double bond in Laromer) was charged to the reaction mixture and heated at a temperature in the range of ≥75 to 85° C. until complete reaction of aminopropyl imidazole to obtain the dispersant according to the presently claimed invention.

The novel dispersant, comparative dispersants and reference products were tested in resin free pigment concentrates on carbon black which is difficult to disperse.

A millbase was prepared by mixing a pigment (Monarch 1300) and a dispersant with 1-methoxy-2-propyl acetate (MPA) (total amount of RFPC=35 G, grinding media=35 G glass bead). The mixture was mixed for 4 hours using Skandex and the glass beads were removed by filtration. The viscosities of the pigment dispersion obtained were measured after 24 hours using a Paar Physika UD 200 rheometer with a cone/plate geometry. The viscosities were measured in the shear range of from 0.01 to 1024 1/s. The millbase obtained were stored at 50° C. for 2 weeks and measured viscosities again. The results are tabulated in table 2.

TABLE 2

| Sample | Fresh Millbase viscosity at 1 s-1 (mPa*s) | Millbase viscosity after storage at 1 s-1 (mPa*s) |
|---|---|---|
| Reference | 319 | 3970 |
| Comparative 1 | 53200 | Solid MB/measurement not applicable |
| Comparative 2 | 60500 | Solid MB/measurement not applicable |
| Comparative 3 | 2280 | Solid MB/measurement not applicable |

TABLE 1

| Example | Isocyanate(A) | isocyanate reactive component (B) | Double bond reactive component (D) | Appearance of the copolymer obtained |
|---|---|---|---|---|
| Comparative 1 | Basonat HI 100 ® | Jeffamine M2070 ® | aminopropyl imidazole 0.1 equimolar based on double bond | wax/solid |
| Comparative 2 | Basonat HI 100 ® | Jeffamine M2070 ® | aminopropyl imidazole 0.2 equimolar based on double bond | wax/solid |
| Comparative 3 | Basonat HI 100 ® | Jeffamine M2070 ® | aminopropyl imidazole 0.3 equimolar based on double bond | wax/solid |
| Comparative 4 | Basonat HI 100 ® | Jeffamine M2070 ® | aminopropyl imidazole 0.4 equimolar based on double bond | wax/solid |
| Comparative 5 | Basonat HI 100 ® | Jeffamine M2070 ® | aminopropyl imidazole 0.5 equimolar based on double bond | wax/solid |
| Comparative 6 | Laromer PR 9000 ® | Jeffamine M2070 ® 1.0 equimolar based on NCO content | None | Liquid |
| 7 | Laromer PR 9000 ® | Jeffamine M2070 ® 1.0 equimolar based on NCO content | aminopropyl imidazole 0.25 equimolar based on double bond | Liquid |
| 8 | Laromer PR 9000 ® | Jeffamine M2070 ® 1.0 equimolar based on NCO content | aminopropyl imidazole 0.50 equimolar based on double bond | Liquid |
| 9 | Laromer PR 9000 ® | Jeffamine M2070 ® 1.0 equimolar based on NCO content | aminopropyl imidazole 0.90 equimolar based on double bond | Liquid |
| 10 | Laromer PR 9000 ® | Jeffamine M2070 ® 1.1 equimolar based on NCO content | aminopropyl imidazole 0.90 equimolar based on double bond | Liquid |
| 11 | Laromer PR 9000 ® | Jeffamine M2070 ® 1.1 equimolar based on NCO content | N,N-Dimethyl-1,3-propandiamine 0.5 equimolar based on double bond | Liquid |
| 12 | Laromer PR 9000 ® | Jeffamine M2070 ® 1.1 equimolar based on NCO content | N,N-Dimethyl-1,3-propandiamine 0.75 equimolar based on double bond | Liquid |
| 13 | Laromer PR 9000 ® | Jeffamine M2070 ® 1.1 equimolar based on NCO content | N,N-Dimethyl-1,3-propandiamine 0.9 equimolar based on double bond | Liquid |

TABLE 2-continued

| Sample | Fresh Millbase viscosity at 1 s-1 (mPa*s) | Millbase viscosity after storage at 1 s-1 (mPa*s) |
|---|---|---|
| Comparative 4 | 14400 | Solid MB/measurement not applicable |
| Comparative 5 | 9350 | Solid MB/measurement not applicable |
| Comparative 6 | 73800 | Solid MB/measurement not applicable |
| Example 7 | 41 | 19600 |
| Example 8 | 14 | 482 |
| Example 9 | 15 | 288 |
| Example 10 | 33 | 365 |
| Example 11 | 37 | 1520 |
| Example 12 | 34 | 106 |
| Example 13 | 22 | 63 |

It is evident form the above depicted table that the dispersant of the presently claimed invention provide stable liquid composition even on storing over 2 weeks.

Reference example was prepared by reacting polyisocyanurate with a polyester (made from caprolactone and cetylalcohol) and aminopropyl imidazole. [The reference example is based on EP0154678B2]

The invention claimed is:

1. A copolymer obtained by:
   a. reacting at least one isocyanate (A) comprising at least one allophanate group and at least one active double bond with at least one isocyanate reactive component (B) to form an intermediate product (C), wherein the intermediate product (C) has an NCO content <0.2 wt. %, based to the overall weight of the intermediate product (C); and
   b. reacting the intermediate product (C) obtained in step a. with at least one active double bond reactive component (D) to obtain the copolymer;
   wherein the at least one isocyanate reactive component (B) is selected from the group consisting of monofunctional polyether amine (B1), monofunctional polyether alcohol (B2), —C$_6$-C$_{30}$ monofunctional alcohol (B3) and monofunctional polyester alcohol (B4);
   and wherein the at least one active double bond reactive component (D) is selected from the group consisting of imidazole, 1H-imidazol-1-amine, (1H-imidazol-1-yl)methanamine, (1H-imidazol-1-yl)ethan-1-amine, 3-(1H-imidazol-1-yl)propan-1-amine, 4-(1H-imidazol-1-yl)butan-1-amine, 5-(1H-imidazol-1-yl)pentan-1-amine, N-ethyl-2-(1H-imidazol-1-yl)ethan-1-amine, (1H-imidazol-1-yl)methanethiol, 2-(1H-imidazol-1-yl)ethane-1-thiol, 3-(1H-imidazol-1-yl)propane-1-thiol, 4-(1H-imidazol-1-yl)butane-1-thiol, (1H-1,2,3-triazol-1-yl)methanamine, 1H-1,2,3-triazole, 2-(1H-1,2,3-triazol-1-yl)ethan-1-amine, 3-(1H-1,2,3-triazol-1-yl)propan-1-amine, 4-(1H-1,2,3-triazol-1-yl)butan-1-amine, 5-(1H-1,2,3-triazol-1-yl)pentan-1-amine, (1H-1,2,3-triazol-1-yl)methanethiol, 2-(1H-1,2,3-triazol-1-yl)ethane-1-thiol, 3-(1H-1,2,3-triazol-1-yl)propane-1-thiol, 4-(1H-1,2,3-triazol-1-yl)butane-1-thiol, 5-(1H-1,2,3-triazol-1-yl)pentane-1-thiol, 4H-1,2,4-triazole, (4H-1,2,4-triazol-4-yl)methanamine, 2-(4H-1,2,4-triazol-4-yl)ethan-1-amine, 3-(4H-1,2,4-triazol-4-yl)propan-1-amine, 4-(4H-1,2,4-triazol-4-yl)butan-1-amine, 5-(4H-1,2,4-triazol-4-yl)pentan-1-amine, (4H-1,2,4-triazol-4-yl)methanethiol, 2-(4H-1,2,4-triazol-4-yl)ethane-1-thiol, 3-(4H-1,2,4-triazol-4-yl)propane-1-thiol, 4-(4H-1,2,4-triazol-4-yl)butane-1-thiol, 5-(4H-1,2,4-triazol-4-yl)pentane-1-thiol, (1H-tetrazol-1-yl)methanamine, 2-(1H-tetrazol-1-yl)ethan-1-amine, 3-(1H-tetrazol-1-yl)propan-1-amine, 4-(1H-tetrazol-1-yl)butan-1-amine, N-methyl-4-(1H-tetrazol-1-yl)butan-1-amine, 5-(1H-tetrazol-1-yl)pentan-1-amine, (1H-tetrazol-1-yl)methanethiol, 2-(1H-tetrazol-1-yl)ethane-1-thiol, 3-(1H-tetrazol-1-yl)propane-1-thiol, 4-(1H-tetrazol-1-yl)butane-1-thiol and 5-(1H-tetrazol-1-yl)pentane-1-thiol, N,N-diethyl-1,4-butanediamine, 1-(2-aminoethyl)piperazine, 2-(1-pyrrolidyl)-ethylamine, 4-amino-2-methoxy-pyrimidine, 2-dimethylaminoethanol, 1-(2-hydroxyethyl)piperazine, 4-(2-hydroxyethyl)morpholine, 2-mercaptopyrimidine, 2-mercaptobenzimidazole, N,N-dimethyl-1,3-propanediamine, 4-(2-aminoethyl)pyridine, 2-amino-6-methoxy-benzothiazole, 4-aminomethyl-pyridine, N,N-diallylmelamine, 3-amino-1,2,4-triazole, 1-(3-aminopropyl)imidazole, 4-(2-hydroxyethyl)pyridine, 1-(2-hydroxyethyl) imidazole and 3-mercapto-1,2,4-triazole, 1-(2-aminoethyl)imidazolidin-2-one, benzylamine, aniline, branched or linear (C$_2$H$_5$N)$_{1-500}$ and salts thereof.

2. The copolymer according to claim 1, wherein the at least one isocyanate (A) comprising at least one allophanate group and at least one active double bond contains 1, 2, 3, 4, 5, 6, 7, 8, 9 or 10 NCO groups.

3. The copolymer according to claim 1, wherein the at least one isocyanate (A) comprising at least one allophanate group and at least one active double bond is obtained by reacting at least one polyisocyanate (A1) with at least one compound of formula (A2),

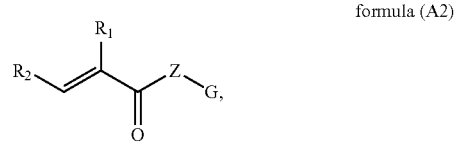

formula (A2)

wherein Z is selected from the group consisting of —O—, —NR$_5$— and —S—;
R$_1$ and R$_2$ are independently of each other selected from the group consisting of H or CH3, linear or branched, substituted or unsubstituted C$_1$-C$_{30}$ alkyl, linear or branched, substituted or unsubstituted C$_2$-C$_{30}$ alkenyl, and substituted or unsubstituted phenyl;
G is selected from the group consisting of —(CH$_2$)$_k$—OH, —(CH$_2$—CH$_2$—O)$_m$H, —(—CH(R$_3$)—CH(R$_4$)—O—)$_n$—H, —CH$_2$—CH(OH)—CH$_2$—O—C(=O)—C(CH$_3$)=CH$_2$ and —CH$_2$—CH(OH)—CH$_2$—O—C(=O)—CH=CH$_2$;
k, m and n are independently of each other an integer in the range of ≥1 to ≤20;
R$_3$ and R$_4$ are independently of each other selected from the group consisting of H, methyl, ethyl, propyl, isopropyl, n-butyl, isobutyl and tert-butyl; and
R$_5$ is selected from the group consisting of H, linear or branched, substituted or unsubstituted C$_{1s}$-C$_{30}$ alkyl, linear or branched, substituted or unsubstituted C$_2$-C$_{30}$ alkenyl, and substituted or unsubstituted phenyl.

4. The copolymer according to claim 3, wherein the at least one polyisocyanate (A1) is selected from the group consisting of 4,4'-diphenylmethanediisocyanate, toluene diisocyanate, naphthylene-1,5-diisocyanate, 1,3-or 1,4-phenylene-diisocyanate, triphenylmethane-4,4',4"-triisocyanate, poly phenyl-polymethylene polyisocyanate, hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6-hexahydrotolyene-diisocyanate, hexahydro-1,3- or -1,4-phenyidiisocyanate and perhydro-2,4'- or -4,4'-dicyclohexylmethanediisocyanate.

5. The copolymer according to claim 3, wherein the at least one compound of formula (A2) is selected from the group consisting of hydroxy acrylate (A2a), and hydroxy acrylamide (A2b).

6. The copolymer according to claim 3, wherein the at least one compound of formula (A2) is selected from the group consisting of hydroxyethyl acrylate, hydroxyethyl methacrylate, hydroxypropyl acrylate, hydroxypropyl methacrylate, hydroxybutyl acrylate, hydroxybutyl methacrylate, hydroxyethyl acrylamide, and hydroxyethyl methacrylamide.

7. The copolymer according to claim 1, wherein the at least one isocyanate (A) has active double bonds in the range from $\geq 1$ to $\leq 10$.

8. The copolymer according to claim 1, wherein the at least one active double bond is a double bond which is conjugated with at least one carbonyl group.

9. The copolymer according to claim 1, wherein the monofunctional polyether amine (B1) is of formula (B1),

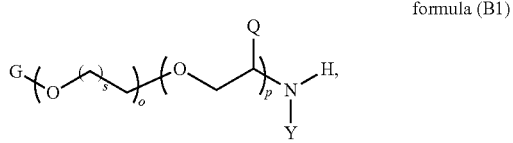

formula (B1)

wherein Y is selected from the group consisting of H, linear or branched, substituted or unsubstituted $C_1$-$C_{30}$ alkyl, and G—$(O(CH_2)_sCH_2)_o$—$(CH_2$—$CH(Q))_p$—;
o and p are independently of each other an integer in the range of $\geq 0$ to $\leq 2000$;
s is an integer in the range of $\geq 1$ to $\leq 10$;
wherein o+p is an integer in the range of $\geq 1$ to $\leq 4000$; and
Q and G are independently of each other selected from the group consisting of methyl, ethyl, propyl, isopropyl, n-butyl, isobutyl, tert-butyl and substituted or unsubstituted phenyl.

10. The copolymer according to claim 9, wherein the monofunctional polyether amine (B 1) has a weight average molecular weight in the range of $\geq 120$ to $\leq 10000$ g/mol, as determined according to GPC.

11. The copolymer according to claim 1, wherein the copolymer has weight average molecular weight $M_w$ in the range of $\geq 1000$ g/mol to $\leq 100000$ g/mol, as determined according to GPC.

12. A method for preparing a copolymer according to claim 1, wherein the process comprises the steps of:
i) mixing at least one isocyanate (A) comprising at least one allophanate group and at least one active double bond, with at least one isocyanate reactive component (B) to obtain a mixture;

ii) heating the mixture obtained m step a. to a desired temperature to obtain an intermediate product (C);
iii) mixing the intermediate product (C) obtained in step b. with at least one active double bond reactive component (D) to obtain a mixture; and
iv) heating the mixture obtained in step c. to a desired temperature to obtain the copolymer;
wherein the at least one isocyanate reactive component (B) is selected from the group consisting of monofunctional polyether amine (B1), monofunctional polyether alcohol (B2), $C_6$-$C_{30}$ monofunctional alcohol (B3) and monofunctional polyester alcohol (B4).

13. The method according to claim 12, wherein the step ii) is conducted at a temperature in the range of $\geq 20$ to $\leq 150°$ C.

14. The method according to claim 12, wherein the steps i) to iv) are conducted in the presence or in the absence of at least one solvent.

15. The method according to claim 14, wherein the at least one solvent is selected from the group consisting of ketones, esters, aromatic solvents, aliphatic solvents, cyclic ethers, ethers and mixtures thereof.

16. The method according to claim 12, wherein the step iv) is conducted at a temperature in the range of $\geq 20$ to $\leq 150°$ C.

17. A liquid composition in the form of a dispersion comprising the copolymer according to claim 1 and a particulate solid material selected from the group consisting of pigments and fillers and a liquid diluent, wherein the particulate solid material is dispersed in the liquid diluent selected from organic solvent or water or mixture from both.

18. The liquid composition according to claim 17, wherein the weight ratio of the particulate solid material to the copolymer is in the range from $\geq 100:1$ to $\leq 1:50$.

19. The liquid composition according to claim 17, comprising
a) $\geq 1$ to $\leq 70\%$ by weight, based on the total weight of the liquid composition, of at least one particulate solid material, selected from the group consisting of pigments and fillers;
b) $\geq 0.5$ to $\leq 50\%$ by weight, based on the total weight of the liquid composition of the copolymer, and
c) $\geq 10$ to $\leq 98.5\%$ by weight, based on the total weight of the liquid composition, of at least one liquid diluent.

20. The liquid composition according to claim 19, wherein the composition is a millbase, a coating composition or an ink.

21. A method comprising utilizing the copolymer according to claim 1 and salts thereof as a dispersant for particulate solid material selected from the group consisting of pigments and fillers.

22. The copolymer according to claim 1, wherein the at least one active double bond reactive component (D) is a primary amine or a secondary amine, and wherein the copolymer has a Millbase viscosity after a two-week storage period of from 63 to 1520 mPa*s.

* * * * *